US012563105B2

(12) United States Patent
Bates et al.

(10) Patent No.: US 12,563,105 B2
(45) Date of Patent: Feb. 24, 2026

(54) DETECTING CONFIGURATION GAPS IN SYSTEMS HANDLING DATA ACCORDING TO SYSTEM REQUIREMENTS FRAMEWORKS

(71) Applicant: OneTrust LLC, Atlanta, GA (US)

(72) Inventors: Evan Bates, Atlanta, GA (US); Jason L Sabourin, Dewitt, MI (US); Kevin Jones, Atlanta, GA (US); Patrick Glenn Murray, Kula, HI (US); Carman Kwong, Coquitlam (CA)

(73) Assignee: OneTrust LLC, Atlanta, GA (US)

( * ) Notice: Subject to any disclaimer, the term of this patent is extended or adjusted under 35 U.S.C. 154(b) by 319 days.

(21) Appl. No.: 18/151,335

(22) Filed: Jan. 6, 2023

(65) Prior Publication Data

US 2023/0144362 A1     May 11, 2023

Related U.S. Application Data

(63) Continuation-in-part of application No. 17/869,144, filed on Jul. 20, 2022, now Pat. No. 11,792,222, (Continued)

(51) Int. Cl.
| | |
|---|---|
| *H04L 9/40* | (2022.01) |
| *G06Q 10/06* | (2023.01) |
(Continued)

(52) U.S. Cl.
CPC ...... *H04L 63/306* (2013.01); *G06Q 10/06311* (2013.01); *G06Q 10/063114* (2013.01); (Continued)

(58) Field of Classification Search
CPC ... H04L 63/306; H04L 63/0414; H04L 63/20; G06Q 10/06311; G06Q 10/063114; G06Q 30/0203; G06Q 30/018
See application file for complete search history.

(56) References Cited

U.S. PATENT DOCUMENTS

| | | | |
|---|---|---|---|
| 6,356,909 | B1 | 3/2002 | Spencer |
| 8,296,244 | B1 | 10/2012 | Heroux |
(Continued)

FOREIGN PATENT DOCUMENTS

| | | | |
|---|---|---|---|
| CN | 111949360 A | * | 11/2020 |
| CN | 212721184 U | * | 3/2021 |
(Continued)

OTHER PUBLICATIONS

Tianyin Xu, "Systems Approaches to Tackling Configuration Errors: A Survey," 2015, ACM Computing Surveys, vol. 47, No. 4, Article No. 70, pp. 1-41. (Year: 2015).*

(Continued)

*Primary Examiner* — Tan D Nguyen
(74) *Attorney, Agent, or Firm* — Ballard Spahr LLP

(57) ABSTRACT

Methods, systems, and non-transitory computer readable storage media are disclosed for managing computing systems according to detect and correct configuration gaps with specific system requirements frameworks. Specifically, the disclosed system accesses a digital data repository to determine attribute values of data objects representing functions or infrastructure associated with handling target data for an entity. The disclosed system determines a digital representation of a system requirements framework that indicates controls associated with handling specific data types. Based on the attribute values and a gap rules set associated with the system requirements framework, the disclosed system determines configuration gaps to be addressed via control actions for installing controls in connection with various data assets or data processing operations. The disclosed system generates tasks to display via a graphical user interface of a computing device for applying modifications to the data assets and/or data processing operations to address the configuration gaps.

20 Claims, 23 Drawing Sheets

Related U.S. Application Data which is a continuation of application No. 17/373,534, filed on Jul. 12, 2021, now Pat. No. 11,425,160, which is a continuation-in-part of application No. 17/191,346, filed on Mar. 3, 2021, now Pat. No. 11,283,840, which is a continuation-in-part of application No. 16/013,037, filed on Jun. 20, 2018, now Pat. No. 10,951,658.

(60) Provisional application No. 63/297,404, filed on Jan. 7, 2022.

(51) Int. Cl.

| | | |
|---|---|---|
| *G06Q 10/0631* | (2023.01) | |
| *G06Q 30/00* | (2023.01) | |
| *G06Q 30/02* | (2023.01) | |
| *G06Q 30/0203* | (2023.01) | |
| *G06Q 30/018* | (2023.01) | |

(52) U.S. Cl.
CPC ..... *G06Q 30/0203* (2013.01); *H04L 63/0414* (2013.01); *G06Q 30/018* (2013.01)

(56) References Cited

U.S. PATENT DOCUMENTS

| | | | |
|---|---|---|---|
| 9,729,583 B1 | 8/2017 | Barday | |
| 9,992,230 B1 | 6/2018 | Haverty et al. | |
| 10,860,721 B1 | 12/2020 | Gentile | |
| 11,792,222 B2 | 10/2023 | Murray et al. | |
| 2001/0049793 A1 | 12/2001 | Sugimoto | |
| 2001/0051913 A1 | 12/2001 | Avinash et al. | |
| 2002/0023109 A1 | 2/2002 | Lederer, Jr. et al. | |
| 2002/0059093 A1 | 5/2002 | Barton et al. | |
| 2002/0107875 A1 | 8/2002 | Seliger et al. | |
| 2002/0120472 A1 | 8/2002 | Dvorak et al. | |
| 2002/0184068 A1 | 12/2002 | Krishnan et al. | |
| 2003/0084014 A1 | 5/2003 | Sohrabi et al. | |
| 2003/0229525 A1 | 12/2003 | Callahan et al. | |
| 2003/0233258 A1 | 12/2003 | Cottrell et al. | |
| 2004/0193907 A1 | 9/2004 | Patanella | |
| 2005/0010819 A1 | 1/2005 | Williams et al. | |
| 2005/0044418 A1* | 2/2005 | Miliefsky | H04L 63/0272 |
| | | | 726/4 |
| 2005/0071185 A1 | 3/2005 | Thompson | |
| 2005/0197952 A1 | 9/2005 | Shea et al. | |
| 2005/0228688 A1 | 10/2005 | Visser et al. | |
| 2006/0047561 A1 | 3/2006 | Bolton | |
| 2007/0239495 A1 | 10/2007 | Osborn et al. | |
| 2007/0250699 A1 | 10/2007 | Dube et al. | |
| 2007/0288253 A1 | 12/2007 | Cobb et al. | |
| 2008/0015913 A1 | 1/2008 | Courtney et al. | |
| 2008/0040773 A1* | 2/2008 | AlBadarin | H04L 63/0892 |
| | | | 726/1 |
| 2009/0119141 A1 | 5/2009 | McCalmont et al. | |
| 2009/0265199 A1 | 10/2009 | Moerdler et al. | |
| 2009/0299802 A1 | 12/2009 | Brennan | |
| 2010/0106653 A1 | 4/2010 | Sandholm et al. | |
| 2011/0173104 A1 | 7/2011 | Vernon et al. | |
| 2011/0208663 A1 | 8/2011 | Kennis et al. | |
| 2011/0251865 A1 | 10/2011 | Yuen et al. | |
| 2012/0011077 A1 | 1/2012 | Bhagat | |
| 2012/0041769 A1 | 2/2012 | Dalal et al. | |
| 2012/0102543 A1 | 4/2012 | Kohli | |
| 2013/0067078 A1 | 3/2013 | Banerjee et al. | |
| 2013/0081101 A1* | 3/2013 | Baer | G06F 21/577 |
| | | | 726/1 |
| 2013/0104236 A1 | 4/2013 | Ray et al. | |
| 2013/0124244 A1 | 5/2013 | Johnson et al. | |
| 2013/0159277 A1 | 6/2013 | Liu et al. | |
| 2013/0227697 A1 | 8/2013 | Zandani | |
| 2013/0246217 A1 | 9/2013 | Denton et al. | |
| 2013/0325731 A1 | 12/2013 | Guamery et al. | |
| 2013/0340030 A1 | 12/2013 | Riley et al. | |

| | | | |
|---|---|---|---|
| 2014/0039959 A1 | 2/2014 | Clarke et al. | |
| 2014/0046863 A1 | 2/2014 | Gifford et al. | |
| 2014/0090071 A1 | 3/2014 | Salehie et al. | |
| 2014/0137257 A1 | 5/2014 | Martinez et al. | |
| 2014/0365555 A1 | 12/2014 | Jwalanna | |
| 2014/0373161 A1* | 12/2014 | Hudson | H04L 63/1433 |
| | | | 726/25 |
| 2014/0380488 A1 | 12/2014 | Ray et al. | |
| 2015/0172321 A1 | 6/2015 | Kirti et al. | |
| 2015/0188949 A1 | 7/2015 | Mahaffey et al. | |
| 2015/0237062 A1 | 8/2015 | Roytman et al. | |
| 2016/0189198 A1 | 6/2016 | Mckenzie et al. | |
| 2016/0358116 A1* | 12/2016 | Cline | G16H 10/60 |
| 2016/0371369 A1 | 12/2016 | Cormack et al. | |
| 2017/0032035 A1 | 2/2017 | Gao et al. | |
| 2017/0103441 A1 | 4/2017 | Kolb et al. | |
| 2017/0132203 A1 | 5/2017 | Kim et al. | |
| 2017/0132313 A1 | 5/2017 | Kukla et al. | |
| 2017/0243028 A1 | 8/2017 | LaFever et al. | |
| 2017/0323265 A1 | 11/2017 | Burrows et al. | |
| 2017/0337287 A1 | 11/2017 | Gill | |
| 2017/0357502 A1 | 12/2017 | Barday | |
| 2018/0285887 A1 | 10/2018 | Maung | |
| 2019/0124120 A1 | 4/2019 | OReilly | |
| 2019/0149565 A1 | 5/2019 | Hagi et al. | |
| 2019/0303807 A1* | 10/2019 | Gueye | G06F 16/9537 |
| 2020/0019909 A1* | 1/2020 | Grimon | G06Q 10/06316 |
| 2020/0275492 A1* | 8/2020 | Lei | H04W 72/0446 |
| 2021/0035116 A1 | 2/2021 | Berrington et al. | |
| 2021/0345323 A1* | 11/2021 | Axmon | H04W 72/12 |
| 2023/0267416 A1* | 8/2023 | Christensen | G06Q 10/06393 |
| | | | 705/301 |

FOREIGN PATENT DOCUMENTS

| | | | | | |
|---|---|---|---|---|---|
| CN | 213365318 U | * | 6/2021 | | |
| CN | 113158549 A | * | 7/2021 | | G06F 30/27 |
| WO | 2001061593 A1 | | 8/2001 | | |
| WO | WO-2020185204 A1 | * | 9/2020 | | H04L 63/20 |

OTHER PUBLICATIONS

Michael Vierhauser, "Requirements monitoring frameworks: A systematic review" 2016, Information and Software Technology, 80, pp. 89-109. (Year: 2016).*

Pietro Colombo, "Bridging the gap between requirements and design: An approach based on Problem Frames and SysML," 2012, The Journal of Systems and Software 85, pp. 717-745. (Year: 2012).*

Esayas, Samson, "Structuring Compliance Risk Identification Using the CO RAS Approach: Compliance as an Asset", Nov. 2014, IEEE International Symposium on Software Reliability Engineering Workshops, pp. 281-286 (Year: 2014).

U.S. Appl. No. 17/669,885, Aug. 28, 2024, Notice of Allowance.

Brown et al. "Multitenancy—Security Risks and Countermeasures", Sep. 2012, 15th International Conference on Network-Based Information Systems, pp. 7-13 (Year: 2012).

U.S. Appl. No. 17/669,885, May 31, 2024, Office Action.

U.S. Appl. No. 18/469,893, Apr. 24, 2024, Office Action.

U.S. Appl. No. 18/469,893, Jul. 25, 2024, Notice of Allowance.

Capterra, "Proposal Management Software", https://www.capterra.com/proposal-management-software/, Apr. 10, 2018, VA, USA.

Hayes et al., Expert system for development of request for proposal packages and evaluation of proposals, May 1989, Proceedings of the IEEE National Aerospace and Electronics Conference, vol. 3, pp. 1364-1369 (Year: 1989).

Liu et al., Research and Design of Security Audit System for Compliance, Aug. 2012, International Symposium on Information Technologies in Medicine and Education, pp. 905-909 (Year: 2012).

Loopio, "Customer Success Story", https://www.loopio.com, Apr. 10, 2018, Toronto, Canada.

Loopio, "RFP Software I Respond to RFPs with Loopio", https://www.loopio.com, Apr. 10, 2018, Toronto, Canada.

Motahari-Nezhad et al., RFPCog: Linguistic-Based Identification and Mapping of Service Requirements in Request for Proposals

(56) References Cited

OTHER PUBLICATIONS (RFPs) to IT Service Solutions, Jan. 2016, 49th Hawaii International Conference on System Sciences, pp. 1691-1700 (Year: 2016).

Qvidian, "Qvidian Proposal Automation Advantage: The inciteKnowledge Migration Opportunity", Connect11 Conference, Apr. 11, 2011, FL, USA.

Song et al., "Enterprise Internal Controlling Risks and Prevention within ERP System", Nov. 2011, International Conference on Information Management, Innovation Management and Industrial Engineering, pp. 41-44 (Year: 2011).

Djemame et al., "A Risk Assessment Framework for Cloud Computing", Jul. 2016, IEEE Transactions on Cloud Computing, vol. 4, No. 3, pp. 265-278 (Year: 2016).

U.S. Appl. No. 16/013,037, May 6, 2020, Office Action.

U.S. Appl. No. 16/013,037, Nov. 9, 2020, Notice of Allowance.

U.S. Appl. No. 17/191,346, Jul. 20, 2021, Office Action.

U.S. Appl. No. 17/191,345, Nov. 15, 2021, Notice of Allowance.

U.S. Appl. No. 17/373,534, Nov. 29, 2021, Office Action.

U.S. Appl. No. 17/373,534, Apr. 8, 2022, Notice of Allowance.

U.S. Appl. No. 17/869,144, Feb. 16, 2023, Office Action.

U.S. Appl. No. 17/869,144, Jun. 12, 2023, Notice of Allowance.

* cited by examiner

Digital Data Repositories *108*

Server Device(s) *104*

Compliance Management Computing System *102*

Network *112*

Third-Party Computing Systems *110*

Client Device *106*

Client Application *114*

*100*

Generate A Compliance Initiative *800*

Determine A System Requirements Framework *802*

Assign Control Actions For Controls *804*

Link Control Actions Across Frameworks *806*

Determine Gap Rules *808*

Receive Selection Of Data Objects *810*

Link Data Objects To The Compliance Initiative *812*

| Evidence Task | Product Scope | Associated Frameworks | Timeframe | User | Last Collected | Overall Status |
|---|---|---|---|---|---|---|
| Data encryption at rest *1900a* | Multiple | PCI 8.2.1 A.10.1.1 S05 | Yearly | User 1 | Last Thursday | Complete |
| Firewall configuration settings *1900b* | Multiple | PCI 1.2.1 PCI 1.2 | Yearly | User 1 | Last Thursday | Complete |

Determining Attribute Values Of Data Objects Representing Functions Or Infrastructures Associated With Handling Target Data

2104

Determining A Digital Representation Of A Regulatory Framework

2106

Determining Compliance Gaps Based On The Attribute Values And A Set Of Gap Rules

2108

Generating Tasks According To The Compliance Gaps

DETECTING CONFIGURATION GAPS IN SYSTEMS HANDLING DATA ACCORDING TO SYSTEM REQUIREMENTS FRAMEWORKS

CROSS-REFERENCE TO RELATED APPLICATIONS

This application is a continuation-in-part of U.S. patent application Ser. No. 17/869,144 filed Jul. 20, 2022, which is a continuation of U.S. patent application Ser. No. 17/373,534 filed Jul. 12, 2021, now issued as U.S. Pat. No. 11,425,160, which is a continuation-in-part of U.S. patent application Ser. No. 17/191,346 filed Mar. 3, 2021, now issued as U.S. Pat. No. 11,283,840, which is a continuation-in-part of Ser. No. 16/013,037 filed Jun. 20, 2018, now issued as U.S. Pat. No. 10,951,658, the full disclosures of which is incorporated herein by reference. This application claims priority to U.S. Provisional Application No. 63/297,404 filed Jan. 7, 2022, the full disclosure of which is incorporated herein by reference.

BACKGROUND

Advances in computer processing and data storage technologies have led to a significant increase in the amount and types of data moved to digital environments for processing. Specifically, many entities utilize computing devices to store, analyze, and transmit different types of data. Computing systems handling (e.g., collecting, receiving, transmitting, storing, processing, sharing, and/or the like) certain types of data are often subject to handling such data in a compliant manner according to different location-based regulations. More specifically, many locations (e.g., countries, states, provinces, or other regulatory bodies) implement laws, regulations, or standards that include requirements for handling certain types of data in specific ways for security and privacy reasons.

To illustrate, many systems require that financial data associated with payment cards be handled according to the Payment Card Industry Data Security Standard ("PCI DSS"), which specifies twelve different requirements for compliance with a system requirements framework for protecting cardholder data. Accordingly, computing systems that are involved in handling such financial data are required to implement specific controls via data asset structures, applications, or communications methods to be in compliance with the PCI DSS. For example, some controls involved in PCI DSS include installing and maintaining a firewall configuration to protect cardholder data, implementing data retention and disposal policies for cardholder data storage, and masking primary account numbers (PANs) when displayed to prevent unauthorized users/systems from having access to the full PANs.

Due to different system requirements frameworks having different control requirements, implementing such control requirements in computing systems can be a challenging task. In particular, due to the complexity and scale of many large data processing operations (e.g., in a credit card processing system), the overall computing system used to complete processing operations may include a large number of individual data assets (e.g., servers, storage devices, software applications) and data processing activities (e.g., transferring data between data assets, storing data in a data asset, interfacing with external systems). Additionally, large scale computing systems can often include data assets and data processing activities in different locations/jurisdictions, thus invoking different applicable system requirements frameworks (e.g., different applicable laws, regulations, or standards). Implementing such computing systems involving different jurisdictions can add significant technical challenges to comply with the different system requirements frameworks based on the number of different requirements for handling specific data types in the different jurisdictions. Furthermore, as system requirements frameworks, computing systems, and data change over time, adapting computing systems corresponding to the system requirements frameworks can introduce additional technical challenges.

SUMMARY

This disclosure describes one or more embodiments of methods, non-transitory computer readable media, and systems that solve the foregoing problems (in addition to providing other benefits) by managing computing systems according to detect and correct configuration gaps with specific system requirements frameworks. Specifically, the disclosed systems access a digital data repository to determine attribute values of data objects associated with functions or infrastructure that handle target data for an entity. The disclosed systems also determine a digital representation of a system requirements framework that indicates a plurality of controls associated with handling specific data types. Based on the attribute values and a gap rules set associated with the system requirements framework, the disclosed systems determine configuration gaps to be addressed via control actions for installing controls in connection with various data assets or data processing operations. Additionally, the disclosed systems generate tasks to display via a graphical user interface of a computing device for applying modifications to the data assets and/or data processing operations to address the configuration gaps for complying with the system requirements framework. The disclosed systems thus provide efficient, accurate, and flexible configuration gap detection and correction for providing improved security and privacy of digital data.

BRIEF DESCRIPTION OF THE DRAWINGS

Various embodiments will be described and explained with additional specificity and detail through the use of the accompanying drawings.

FIGS. 19-20 illustrate examples of graphical user interfaces for viewing information associated with determined evidence objects in accordance with one or more embodiments.

DETAILED DESCRIPTION

Figure 1:
FIG. 1 illustrates an example of a system environment in which a compliance management computing system can operate in accordance with one or more embodiments.

This disclosure describes one or more embodiments of a compliance management computing system that manages compliance of computing systems with system requirements frameworks according to the manner in which the computing systems handle certain data types. In one or more embodiments, the compliance management computing system computes a compliance determination (e.g., one or more compliance scores) for a compliance initiative. To do so, the compliance management computing system processes an inventory of data objects associated with the compliance initiatives. The data objects can represent, for example, data assets and data processing operations (or other functions or infrastructure) to identify attribute values of the data objects (and represented functions/infrastructure). The compliance management computing system also accesses a digital representation of a system requirements framework including controls for handling specific data types. Additionally, the compliance management computing system determines configuration gaps based on the attribute values of the data objects and a gap rules set associated with the system requirements framework. More specifically, the configuration gaps represent, for example, control actions for ensuring that the data assets and data processing operations are used, managed, or implemented in compliance with a system requirements framework. A control action specifies one or more of the controls indicated by the system requirements framework that should be installed in connection with data assets and/or data processing operations.

A compliance initiative is a data structure specifying parameters for a compliance determination. For instance, these parameters could include user-specified parameters such as an object group identifier, an observation period, and a framework set identifying one or more system requirements frameworks. These parameters could also include sets generated by the compliance management computing system, such as a control action set identifying controls to be implemented for compliance with the framework set as well as evidence object sets for tracking evidence that demonstrates implementation of the controls. The object group identifier can identify an inventory of data objects used to determine compliance with the framework set. For instance, if the object group identifier identifies a particular legal entity, the compliance management computing system selects an inventory of data objects that identify the same entity (or that are linked to data objects identifying the entity) in order to perform a compliance determination. The framework set can be populated in response to user input, as described herein. The compliance management computing system can perform the compliance determination using attributes of the data objects in the selected inventory, applicable controls determined from a combination of the object group identifier and the framework set, and evidence accessible to the compliance management computing system. Examples of these operations are described in detail herein.

As mentioned, in one or more embodiments, the compliance management computing system determines attribute values from an inventory of data objects. In particular, the compliance management computing system determines a set of data objects that represent functions or architecture for handling target data for an entity, such as data objects for data assets or data processing operations that are identified in a data inventory associated with the entity. For example, the compliance management computing system determines, based on data objects, functions or infrastructure that handle financial data covered by a specific set of regulations or standards (e.g., by a legislative or other governing body). The compliance management computing system utilizes a data extraction software application integrated with a digital data repository to determine or otherwise identify attribute values of the data objects. The compliance management computing system can also connect, via suitable integrations, to external software tools and use these software tools to collect evidence of controls being implemented relative to a given framework.

According to one or more embodiments, the compliance management computing system determines a system requirements framework indicating controls for handling specific data types. Specifically, the compliance management computing system accesses the digital data repository to identify a digital representation of the system requirements framework that includes one or more files storing information about controls for implementing various operational programs, such as information security or physical security.

In one or more embodiments, the compliance management computing system determines configuration gaps indicating that one or more functions or infrastructure elements represented by the data objects are not in compliance with a system requirements framework. In particular, the compliance management computing system determines a gap rules set, which includes one or more gap rules associated with the system requirements framework. A gap rule can identify one or more control actions, which are associated with controls of the system requirements framework, that are required for a compliance initiative in response to detecting certain data object attribute values. As a simplified example, a gap rule can indicate that if a data object for a data asset has a "location" attribute with a value indicating that the data asset is located in a certain jurisdiction, then a set of one or more control actions (e.g., compliance with jurisdiction-specific data security practices) must be taken for the compliance initiative involving the data asset. The compliance management computing system utilizes the gap rules to determine configuration gaps, which indicate control actions needed for installing certain controls in connection with data assets and/or data processing operations according to the system requirements framework.

In additional embodiments, the compliance management computing system determines evidence objects according to a particular system requirements framework. For example, the compliance management computing system utilizes the gap rules corresponding to the system requirements framework to determine specific controls that have been installed in relation to the system requirements framework. In this example, the compliance management computing system determines that an evidence object specifies a certain type of evidence indicating that at least a portion of a given control is installed in connection with data assets and/or data processing operations. If the compliance management computing system determines that an evidence task corresponding to a particular evidence object is complete, then the compliance management computing system thereby determines that the control is installed. Additionally, the compliance management computing system can determine, from suitable mapping data, that a particular evidence object is applicable to multiple controls and/or system requirements frameworks (e.g., collection of the evidence specified by the evidence object verifies the presence of the controls). For instance, if the evidence object is mapped to multiple controls (in the same system requirements framework or across multiple system requirements frameworks), then the compliance management computing system can determine that each of the controls is installed, thereby limiting the number of gap remediation processes that need to be performed using the compliance management computing system.

In one or more embodiments, the compliance management computing system generates tasks for display via a graphical user interface of a computing device based on determined configuration gaps. Specifically, the compliance management computing system determines one or more tasks for applying modifications to data assets and/or data processing operations according to determined configuration gaps. For example, the compliance management computing system generates graphical user interface elements including the configuration gaps indicating various control actions to install controls for an entity to be in compliance with the system requirements framework. Additionally, the compliance management computing system can generate graphical user interface elements including tasks for modifying data assets and/or data processing operations according to the corresponding configuration gaps.

Some embodiments involve including a compliance management computing system as a component of an environment that includes software and/or hardware for implementing communication, physical, and/or information security. In these embodiments, the operation of an environment including software and/or hardware for implementing communication, physical, and/or information security can be improved via inclusion of the compliance management computing system and operation of various process and rules applied by the compliance management computing system, as described herein. In one example, an environment can include the compliance management computing system as well as computing systems that implement communication security features, such as encryption tools for protecting electronic messaging, that can be configured based on configuration gaps identified using the compliance management system. For instance, if the status of an evidence task in a compliance initiative indicates that required controls for an electronic messaging system have not been implemented (e.g., requiring end-to-end encryption, etc.), then the electronic messaging system can be configured through automated and/or manual means to implement those controls determined utilizing the compliance management computing system. In another example, an environment can include the compliance management computing system as well as computing systems and hardware that implement physical security features, such as entry controls and barriers for secure areas, that can be configured based on configuration gaps identified using the compliance management computing system. For instance, if the status of an evidence task in a compliance initiative indicates that required physical controls have not been implemented, then the computing systems and hardware can be installed and/or configured through automated and/or manual means to implement those controls (e.g., via processes corresponding to the compliance management computing system). In another example, an environment can include the compliance management computing system as well as computing systems that implement technical security features, such as access management systems for enforcing network authentication procedures or data storage systems with tools for protecting sensitive data, which can be configured based on configuration gaps identified using the compliance management computing system. For instance, if the status of an evidence task in a compliance initiative indicates that a lack of implementation of required controls for an access management system (e.g., requiring strong passwords, requiring two-factor authentication, etc.) or a data storage system (e.g., implementing a specified form of data encryption at rest), then the access management system or data storage system can be configured through automated and/or manual means to implement those controls in connection with the compliance management computing system.

Additionally or alternatively, certain embodiments described herein can improve upon shortcomings of conventional systems in relation to managing computing systems that handle data in specific ways according to various laws, regulations, or standards. Specifically, conventional systems lack efficiency and flexibility in connection with complying with various system requirements frameworks in different jurisdictions. For example, conventional systems typically include rigid computing system structures that fail to adapt to changes in regulatory standards and/or changes in data assets that result in being out of compliance with the regulatory standards. Indeed, the large scale nature of many computing systems across different jurisdictions often results in such conventional systems being out of compliance due to the rigid nature of the computing system structures and their inability to update data assets or data processing operations in a timely manner.

Furthermore, because the conventional systems lack the ability to adapt to changes in regulatory standards and/or data assets, the conventional systems also frequently handle certain data types inaccurately. In particular, some conventional systems utilize various data assessment processes to determine specific benchmarks or measurements in connection with certain frameworks (e.g., security frameworks). While such conventional systems can provide the benchmarks or measurements for domain-specific data at various data assets (e.g., the conventional systems are siloed), the conventional systems lack the ability to determine connections between data across a plurality of different data assets and/or data processing operations for different jurisdictions with changing system requirements frameworks and across a plurality of domains. This results in the conventional systems inaccurately handling specific types of data covered by the changing system requirements frameworks.

As an example, changes to a particular framework or data asset/data processing operation that lead to non-compliant configurations of data handling by the computing systems of the conventional systems can result in inaccurate handling of the data with respect to third-party systems. To illustrate, if a conventional system fails to identify and correct a configuration gap with respect to a particular control of a framework, a computing system may generate, transmit, or otherwise handle data with an incorrect data format (e.g., missing headers, metadata, or incorrect encryption). This may result in a third-party system being unable to process the data (e.g., resulting in rejection of the data by the third-party system or incorrect data being extracted by the third-party system).

Certain embodiments of the disclosed compliance management computing system provide advantages over these conventional systems. For example, the compliance management computing system provides improved efficiency and flexibility for computing systems that manage data subject to various system requirements frameworks. Specifically, in contrast to conventional systems with rigid computing system structures that do not adapt to changes in connection with system requirements frameworks, the compliance management computing system automatically detects configuration gaps for implementing various control actions in connection with data assets and/or data processing operations. More specifically, by utilizing a gap rules set to determine areas of deficiency in data assets/data processing operations that handle specific types of data, the compliance management computing system provides tools for easily modifying data assets and data processing operations to maintain compliance (or bring into compliance) with possibly requirements. For example, the compliance management computing system leverages a compliance initiative to automatically detect deficiencies in computing hardware, computing software, physical controls, etc., based on changes to specific data assets, data processing operations, and/or system requirements frameworks.

Additionally or alternatively, certain embodiments of the compliance management computing system improve the accuracy of assessing computing systems' configuration or use in handling certain types of data in accordance with various technical or other controls, such as security controls or other requirements for operation of a computing system. In contrast to conventional systems that utilize domain-specific, siloed operations to process data, the compliance management computing system determines configuration gaps across a plurality of different data domains, jurisdictions, and data assets/data processing operations. In particular, because the compliance management computing system automatically detects configuration gaps in connection with functions or infrastructure that handle specific data types in connection with various system requirements frameworks, the compliance management computing system improves the accuracy of the data assets/data processing operations in relation to the specific data types by identifying deficiencies in the data assets/data processing operations.

To illustrate, the compliance management computing system can integrate with computing hardware of a third-party system to automatically detect changes to the computing hardware or computing software—for instance, changes to the way in which a particular type of data is stored, transmitted, located, etc.—based on an analysis of files or processes of the computing hardware/software. The compliance management computing system can also communicate with computing systems associated with (or otherwise including information about) system requirements frameworks to detect changes to the frameworks. The compliance management computing system can utilize such information to determine control actions for implementing new/modified configuration requirements to ensure that computing hardware/software of third-party systems processed or otherwise handle specific data types in compliance with the changes to the framework. As an example, the compliance management computing system can automatically detect whether a particular computing system is utilizing the correct encryption for handling a specific data type and assist in addressing any non-compliance. Addressing non-compliance can include, for example, automated modification of one or more devices/computing programs to implement the correct encryption.

Additionally or alternatively, certain embodiments of the compliance management computing system, in contrast to some conventional systems that merely provide generic suggestions for improving an entity's data operations, utilize compliance initiatives to process each individual data object according to a gap rules set with control actions tailored specifically to an entity's functions and infrastructure for handling specific data types. In these embodiments, the compliance management computing system utilizes the unique characteristics of computing systems of an entity to provide customized data processing management and tailored configuration of the entity's computing systems. For example, by determining/analyzing data objects, evidence objects, etc., customized according to an entity's specific data assets/data processing operations, the compliance management computing system determines configuration gaps and assists in correcting the configuration gaps.

Additionally or alternatively, certain embodiments of the compliance management computing system provide an improved graphical user interface for viewing analysis of compliance of an entity's data assets/data processing operations and for implementing changes to the data assets/data processing operations. For example, the compliance management computing system provides automatic analysis and processing of data with graphical user interface tools for modifying data assets and data processing operations to accurately handle specific data types via the generation of compliance initiatives and execution of compliance analyses that update the compliance initiatives. Specifically, the compliance management computing system integrates with an entity's computing systems to automatically communicate with the entity's data assets/data processing operations affected by a particular compliance initiative. By communicating with the data assets/data processing operations, each of which may have a separate communication interface, and providing the information along with interactive interface elements to view, modify, or otherwise interact with the information corresponding to each of the separate data assets or data processing operations, the compliance management computing system provide an improved graphical user interface. Specifically, a user of a client device can view and interact with the data from the different data assets and/or data processing operations within a single graphical user interface without requiring the user to access the separate communication interfaces (e.g., via a file browser, web browser, FTP link, application interface) of each data asset or data processing operation. Additionally, in connection with updating a compliance initiative while executing a compliance management process, the compliance management computing system can provide a graphical user interface for implementing specific modifications to the data assets/data processing operations via the graphical user interface without navigating to the communication interfaces of the data assets/data processing operations.

Turning now to the figures, FIG. 1 includes an embodiment of a system environment 100 in which an compliance management computing system 102 is implemented. In particular, the system environment 100 includes server device(s) 104, a client device 106, digital data repositories 108, and third-party computing systems 110 in communication via a network 112. Moreover, as shown, the client device 106 includes a client application 114.

As shown in FIG. 1, in one or more embodiments, the server device(s) 104 include or host the compliance management computing system 102. Specifically, the compliance management computing system 102 includes, or is part of, one or more systems that process digital data from the digital data repositories 108 and/or the third-party computing systems. For example, the compliance management computing system 102 provides tools to the client device 106 for managing data associated with an entity. In one or more embodiments, the compliance management computing system 102 provides tools to the client device 106 via the client application 114 for viewing information associated with the entity and/or data that the entity handles.

As used herein, the term "data object" refers to a digital object for tracking or managing systems, software, data sources, entities, or other functions or infrastructure involved in handling specified data for an entity. For example, a data object could include a digital representation of the entity itself, a sub-entity such as subsidiary of the entity, a business unit of the entity, a data asset, or a data processing operation. As used herein, the term "data asset" refers to a computing component for handling specified data for an entity in which the data asset is represented by a data object (i.e., a "data asset object"). For example, the compliance management computing system 102 generates/stores a data object representing a data asset including a computing component such as, but not limited to, a computing system, a software application, a website, a mobile application, or a data storage/repository. To illustrate, a data object for a data asset can represent a digital data repository (e.g., the digital data repositories 108) in the form of a database used for storing specified data. Additionally, a data object for a data asset can represent the third-party computing systems 110, or other systems.

Additionally, as used herein, the term "data processing operation" refers to a computing process that performs one or more actions associated with specified data, in which the data processing operation is represented by a data object (i.e., a "data processing operation object"). For example, the compliance management computing system 102 generates/stores a data object representing a data processing operation including, but not limited to, a computing process or action corresponding to execution of processing instructions to process, collect, access, store, retrieve, modify, or delete target data. To illustrate, for target data including credit card information and payment information associated with processing a credit card transaction, the compliance management computing system 102 generates a data object to represent a data processing operation that collects the credit card information through a form (e.g., webpage) provided via the website and processes the credit card information with the appropriate card provider to process the credit card transaction.

In one or more embodiments, the compliance management computing system 102 also provides tools for using the data objects to manage functions or infrastructure subject to one or more laws, regulations, or standards. To illustrate, certain types of data are subject to certain requirements/controls in how the data is handled (e.g., processed, transmitted, stored). Accordingly, the compliance management computing system 102 analyzes the data objects to determine whether the functions or infrastructure represented by the data objects are in compliance with a system requirements framework that indicates the specific requirements/controls. In one or more embodiments a system requirements framework can include a set of computer-based requirements for handling data or otherwise configuring an entity's functions or infrastructure in accordance with a corresponding standard. For example, the compliance management computing system 102 analyzes the data objects to determine "configuration gaps" that indicate a deficiency of functions or infrastructure of an entity with regard to one or more computer-based requirements of a corresponding system requirements framework. Additionally, in some embodiments, a configuration gap includes a compliance gap corresponding to a compliance of the entity with specific requirements or controls of a particular framework. The compliance management computing system 102 thus provides tools to manage the use, environment, or other attributes associated with data objects handling specific data types. As used herein, the terms "regulation," "standard," and "law" refer to an established set of practices enforceable by a governing body such as a government, professional body, or other entity that enacts the set of practices. To illustrate, regulations, standards, or laws (also referred to collectively as "regulations" or "standards") include, for example, a set of practices established by the International Organization for Standardization ("ISO"), internally by a particular organization (e.g., a multinational corporation), or a territory government (e.g., the European Union). The compliance management computing system 102 thus provides tools to manage the use, environment, or other attributes associated with functions or infrastructure handling specific data types in connection with a particular system requirements framework.

As used herein, the term "control" refers to a tool or function for satisfying a requirement from a system requirements framework. An example of a control is a procedure or practice for handling specific data types that entities are required to follow in connection with a regulation governing security or privacy. For instance, a control can include requirements for handling personally identifiable information, financial information, medical information, legal information, or other data types. Furthermore, as used herein, the term "control action" refers to an action to install a particular control for handling specific data types. To illustrate, control actions can include actions for monitoring physical environments, installing environmental protections, restricting or reviewing access authorization to physical data centers, installing physical security controls, implementing specific security or privacy rules within an organization, etc.

According to one or more embodiments, the compliance management computing system 102 manages data objects by communicating with the digital data repositories 108 and/or the third-party computing systems 110. Specifically, the compliance management computing system 102 can communicate with the digital data repositories 108 and/or the third-party computing systems 110 to determine or otherwise obtain information associated with the data objects. For instance, the digital data repositories 108 and/or the third-party computing systems 110 could be controlled or used by an entity that operates a client system including one or more client devices 106. The compliance management computing system 102 can be configured to communicate with the digital data repositories 108 and/or the third-party computing systems 110 on behalf of the entity. For instance, the compliance management computing system 102 can perform this communication via an integration that is installed on the compliance management computing system 102 that is configured with the entity's credentials. The compliance management computing system 102 can obtain, via this communication, metadata or other information about the infrastructure or functions used by the entity and thereby populate attributes of the data objects with this information.

In additional embodiments, the compliance management computing system 102 communicates with the client device 106 to obtain information associated with the data objects or to provide information about the data objects for display within the client application 114. For instance, the compliance management computing system 102 can obtain, via user input received from a client device 106, metadata or other information about the infrastructure or functions used by the entity and thereby populate attributes of the data objects with this information.

In one or more embodiments, the third-party computing systems 110 include server devices, individual client devices, or other computing devices associated with an entity. For instance, a third-party computing system includes one or more computing devices for performing handling data associated with one or more operations of the entity subject to a particular system requirements framework. To illustrate, the third-party computing system includes one or more server devices that generate, process, store, or transmit payment card processing data subject to PCI DSS in one or more jurisdictions.

In one or more embodiments, the server device(s) 104 and/or the client device 106 include a variety of computing devices, including those described below with reference to FIG. 22. For example, the server device(s) 104 includes one or more servers for storing and processing data associated with configuration gap detection and management. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a desktop, a mobile device (e.g., smartphone or tablet), or a laptop including those explained below with reference to FIG. 22. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with data associated with managing compliance of data objects with one or more system requirements frameworks. In some embodiments, the client device 106 also performs functions for generating, capturing, or accessing data to provide to the compliance management computing system 102 in connection with compliance management of data objects. For example, the client device 106 communicates with the server device(s) 104 via the network 112 to provide information (e.g., user interactions) associated with data objects. Although FIG. 1 illustrates the system environment 100 with a single client device, in some embodiments, the system environment 100 includes a different number of client devices. In some embodiments, the client device 106 or the server device(s) 104 also host the digital data repositories 108.

Additionally, as shown in FIG. 1, the system environment 100 includes the network 112. The network 112 enables communication between components of the system environment 100. In one or more embodiments, the network 112 may include the Internet or World Wide Web. Additionally, the network 112 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the client device 106, the digital data repositories 108, and the third-party computing systems 110 communicate via the network using one or more communication platforms and technologies suitable for transporting data and/or communication signals, including any known communication technologies, devices, media, and protocols supportive of data communications, examples of which are described with reference to FIG. 22.

Although FIG. 1 illustrates the server device(s) 104, the client device 106, the digital data repositories 108, and the third-party computing systems 110 communicating via the network 112, in alternative embodiments, the various components of the system environment 100 communicate and/or interact via other methods (e.g., the server device(s) 104, the client device 106, the digital data repositories 108, and/or the third-party computing systems 110 can communicate directly). Furthermore, although FIG. 1 illustrates the compliance management computing system 102 and the digital data repositories 108 being implemented separately within the system environment 100, the compliance management computing system 102 and the digital data repositories 108 can alternatively be implemented, in whole or in part, by a particular component and/or device within the system environment 100 (e.g., the server device(s) 104). Additionally, in some embodiments, the third-party computing systems 110 include the client device 106. In some embodiments, the compliance management computing system 102 can be executed on a server system that provides a multi-tenant environment. The multi-tenant environment can include a tenant (e.g., one or more user accounts sharing common privileges with respect to an application instance) accessible by a particular set of client devices, as well as other tenants inaccessible to that set of client devices (e.g., access controlled to permit only access from other sets of client devices). For instance, in the tenant accessible by a particular client system of one or more client devices 106, certain data objects used by the compliance management computing system 102 may only be available to that client system (e.g., the data objects representing functions or infrastructure of the entity using the client system), with other tenants having other sets of data objects, and instances of the software components of the compliance management computing system 102 described herein may only be available to the client system, with other tenants having access other instances of these software components. In additional or alternative embodiments, the compliance management computing system 102 can be implemented on one or more computing systems operated by a single entity. For instance, the compliance management computing system 102 can be operated on a first server system controlled by the entity (e.g., via an on-premises installation of software components described herein), and can communicate with a second server system that is a client system controlled by the entity.

In some embodiments, the server device(s) 104 support the compliance management computing system 102 on the client device 106. For instance, the server device(s) 104 generates/maintains the compliance management computing system 102 and/or one or more components of the compliance management computing system 102 for the client device 106. The server device(s) 104 provides the generated compliance management computing system 102 to the client device 106 (e.g., as a software application/suite). In other words, the client device 106 obtains (e.g., downloads) the compliance management computing system 102 from the server device(s) 104. At this point, the client device 106 is able to utilize the compliance management computing system 102 to manage compliance of data objects according to one or more system requirements frameworks independently from the server device(s) 104.

In alternative embodiments, the compliance management computing system 102 includes a web hosting application that allows the client device 106 to interact with content and services hosted on the server device(s) 104. To illustrate, in one or more embodiments, the client device 106 accesses a web page supported by the server device(s) 104. The client device 106 provides input to the server device(s) 104 to perform compliance management operations, and, in response, the compliance management computing system 102 on the server device(s) 104 performs operations to view/manage data associated with compliance management. The server device(s) 104 provide the output or results of the operations to the client device 106.

Figure 2:
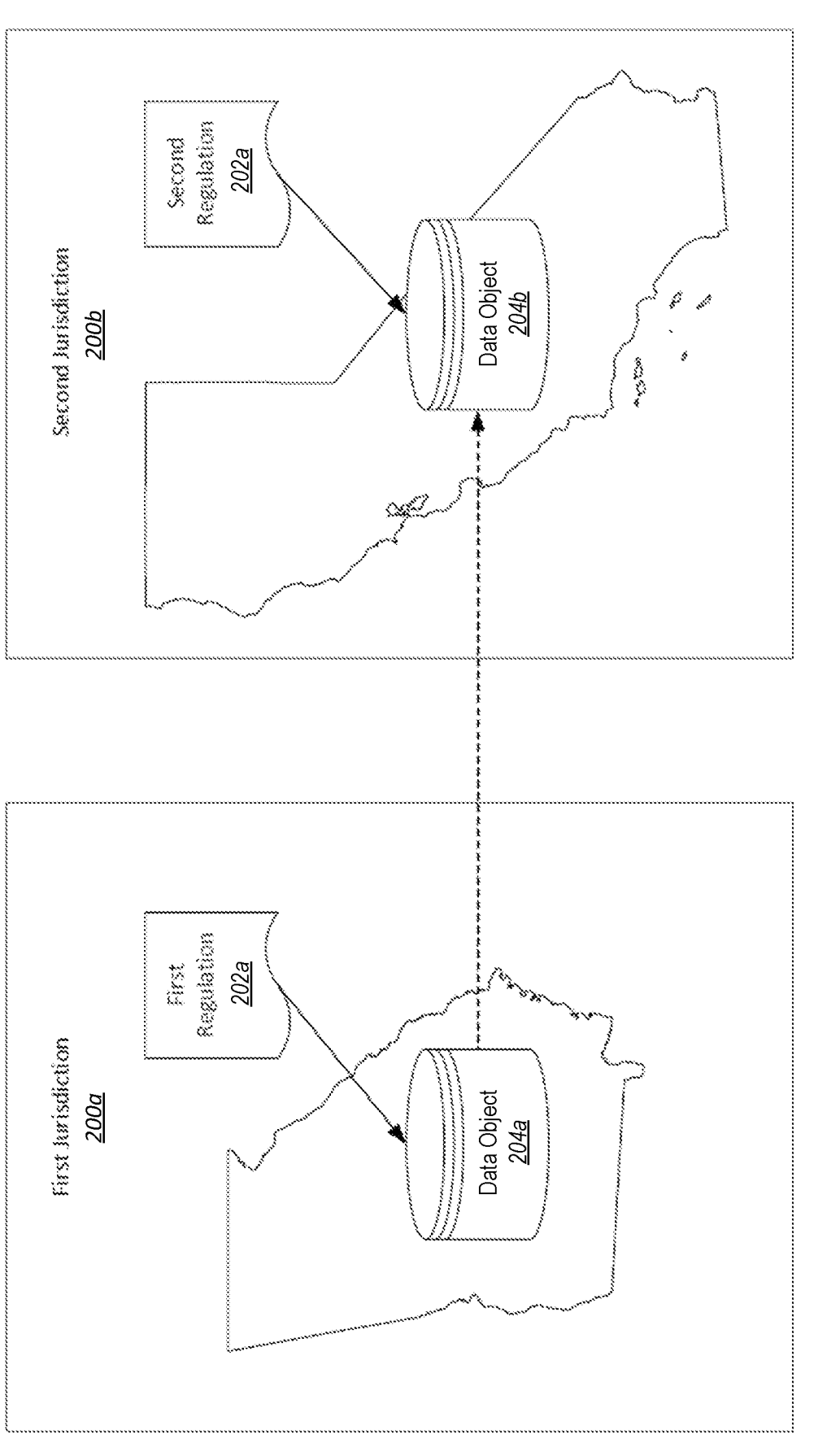
FIG. 2 illustrates an example of data objects representing functions or infrastructure operating in different jurisdictions subject to different regulations in accordance with one or more embodiments.

As mentioned, the compliance management computing system 102 uses data objects to provide compliance management of functions or infrastructure that handle specific types of data associated with an entity subject to one or more system requirements frameworks. FIG. 2 illustrates an example of a plurality of data objects representing functions or infrastructure operating within a plurality of separate jurisdictions. Additionally, FIG. 2 illustrates that the functions or infrastructure represented by the data objects are subject to individual regulations corresponding to the separate jurisdictions. Accordingly, each data object may represent functions or infrastructure that is subject to different requirements for handling specific data types within separate jurisdictions.

For example, a first jurisdiction 200a includes a first regulation 202a indicating a first set of controls for handling one or more specific data types within the first jurisdiction 200a. Additionally, a second jurisdiction 200b includes a second regulation 202b indicating a second set of controls for handling the one or more specific data types within the second jurisdiction 200b. Furthermore, as illustrated in FIG. 2, a first data object 204a represents functions or infrastructure located within the first jurisdiction 200a, and a second data object 204b represents functions or infrastructure located within the second jurisdiction 200b. Accordingly, the functions or infrastructure represented by the first data object 204a is subject to the first regulation 202a, and the functions or infrastructure represented by the second data object 204b is subject to the second regulation 202b.

In one or more embodiments, the first data object 204a represents functions or infrastructure for handling the one or more specific data types subject to the first regulation 202a, which controls how the one or more specific data types are handled in the first jurisdiction 200a. Additionally, the second data object 204b represents functions or infrastructure for handling the one or more specific data types subject to the second regulation 202b, which controls how the one or more specific data types are handled in the second jurisdiction 200b. For example, the first regulation 202a and the second regulation 202b require that computing systems that handle sensitive and/or personal data associated with particular individuals, such as personally identifiable information ("PIP") data, are required to comply with specific sets of controls. To illustrate, the PCI DSS, the Health Insurance Portability and Accountability Act (HIPAA), Fair Credit Reporting Act (FCRA), the Gramm-Leach-Bliley Act, or other regulations, may require that computing systems handle PII data in specific ways via controls put in place with the corresponding system requirements frameworks. Additionally, different jurisdictions may have different regulations (with different corresponding controls) for handling the same types of data.

In one or more embodiments, entities that utilize computing systems to handle such data may utilize a large number of different data assets and/or data processing activities to handle the target data. Additionally, a single entity may utilize some data assets and/or data processing activities that reside or take place in different jurisdictions. To illustrate, a single entity may utilize the functions or infrastructure represented by the first data object 204a and the second data object 204b to perform data processing operations for the one or more data types. Accordingly, the entity implements and manages controls associated with the different functions or infrastructure represented by the data objects (e.g., data assets and/or data processing operations) subject to the different regulations of the corresponding jurisdictions.

As mentioned previously, system requirements frameworks and/or data assets can change over time. For example, a governing body can change a system requirements framework to require more, fewer, or different controls over time. Additionally, an entity may upgrade, replace, or otherwise modify a data asset or data processing operation (e.g., by replacing/upgrading hardware or modifying a software application or process). Due to such changes, controls which the entity may have previously installed to comply with the corresponding system requirements frameworks may no longer be installed, or required controls may also have changed. Thus, the compliance management computing system 102 can assist the entity in updating controls to be in compliance with the corresponding system requirements frameworks (e.g., via modifying the functions or infrastructure represented by the data objects).

As an example, the entity utilizes the functions or infrastructure represented by the first data object 204a and the second data object 204b to perform operations associated with processing credit card payment transactions. Specifically, the functions or infrastructure can include servers for collecting data from users engaging in card-based payment transactions via the entity's website. Over time, the entity may reconfigure one or more of the servers to use a California-based server bank, rather than a Georgia-based server bank, to process the data. As a result of the change in location, one or more new system requirements frameworks may apply to the use of the servers to process credit card payment transactions. For example, California regulations may require different physical access controls than Georgia regulations. Accordingly, reconfiguring the system to change the location of the servers may result in being out of compliance with the applicable system requirements framework(s).

In one or more additional embodiments, other types of events may alter an entity's/computing system's compliance with a particular system requirements framework. For example, a governing body may require additional controls for handling specific types of data. Alternatively, a governing body may enact one or more new system requirements frameworks for handling the specific types of data that were previously not required. In some instances, such events may occur without the knowledge of corresponding personnel of the entity responsible for compliance (e.g., a privacy officer) . In addition, such events may occur without personnel responsible for the event (e.g., personnel responsible for installing/managing a server in California to handle specific data types) understanding the impact that the event has on compliance with the corresponding system requirements framework.

Further, such events may also affect a computing system's susceptibility to data-related incidents such as data breaches, data thefts, unintended data exposures, etc. For example, in the example above, moving the processing activities from the server bank in Georgia to the server bank in California may increase the likelihood of a breach of the credit card data. Therefore, such events can result in increased operational/security/privacy risks. Accordingly, as mentioned above, the compliance management computing system 102 provides tools for an entity to automatically determine the impact of such events on various functions or infrastructure of a computing system. The compliance management computing system 102 also provides tools to assist in modifying functions or infrastructure (e.g., functions or infrastructure represented by the first data object 204a or the second data object 204b) in connection with changes in compliance.

Figure 3A:
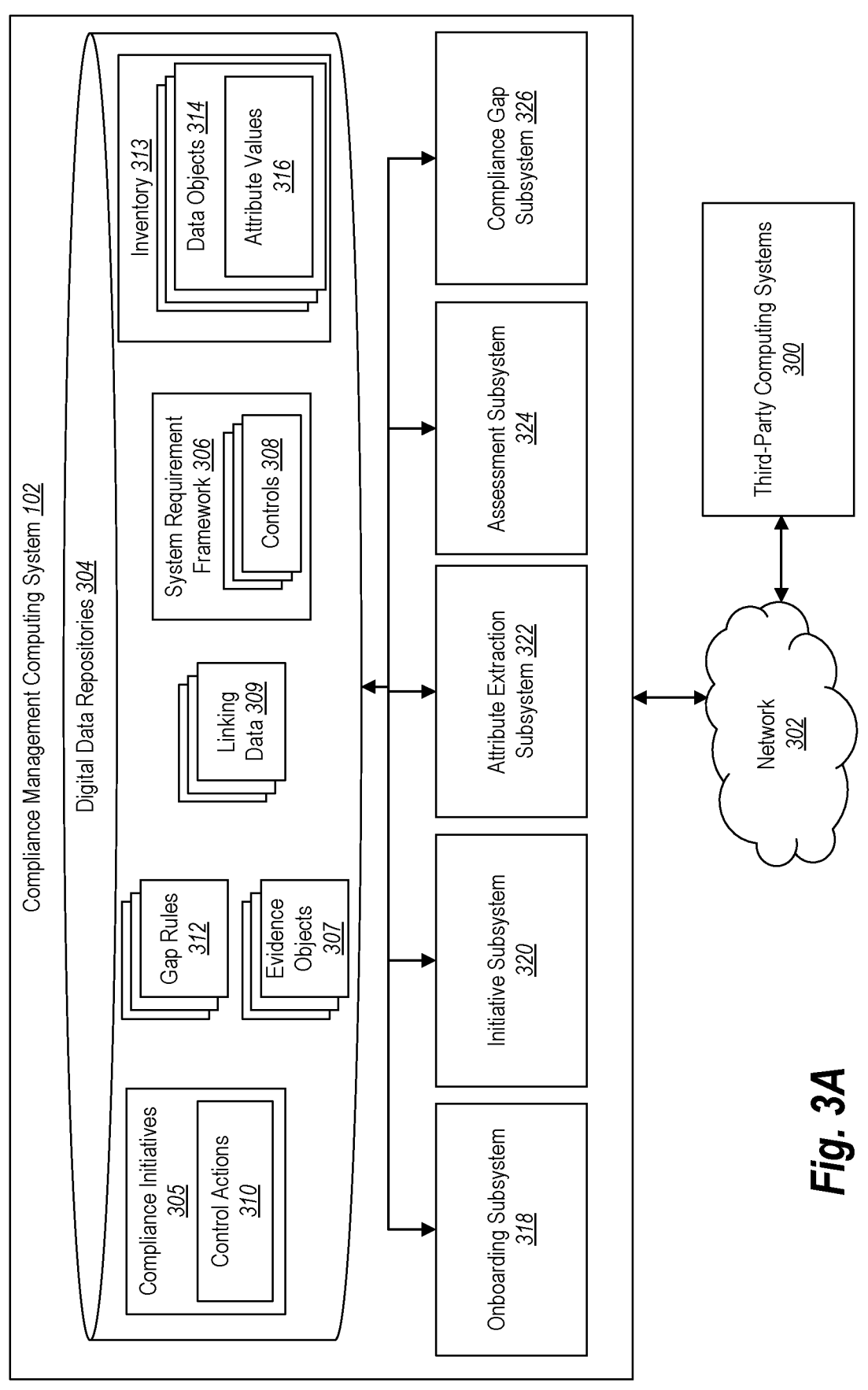
FIG. 3A illustrates an example of an overview of the compliance management computing system determining configuration gaps for functions or infrastructure of an entity according to a system requirements framework in accordance with one or more embodiments.

FIG. 3A illustrates an example of an environment in which the compliance management computing system 102 determines configuration gaps for functions or infrastructure of an entity according to a system requirements framework. Specifically, FIG. 3A illustrates that the compliance management computing system 102 communicates with third-party computing systems 300 (e.g., one or more computing devices associated with the entity) via a network 302 to provide compliance management of one or more functions or infrastructure for handling one or more data types. Additionally, as illustrated, the compliance management computing system 102 includes a plurality of subsystems for performing a plurality of compliance management operations. To illustrate, the subsystems include one or more applications integrated with the digital data repositories 304 and/or the third-party computing systems to determine evidence tasks associated with one or more system requirements frameworks corresponding to one or more compliance initiatives. As described in more detail below, an evidence task refers to collected data indicating one or more requirements that have been met in connection with a particular system requirements framework.

As illustrated in FIG. 3A, the compliance management computing system 102 includes a plurality of digital data repositories 304. In particular, the digital data repositories include data associated with one or more entities. To illustrate, a first digital data repository of the digital data repositories 304 includes data associated with a first entity, a second digital data repository of the digital data repositories 304 includes data associated with a second entity, etc. Alternatively, the digital data repositories 304 store different data types within each digital data repository. Accordingly, a single digital data repository may store data associated with a plurality of different entities. Furthermore, the digital data repositories 304 may store data for an entity across a plurality of digital data repositories.

In one or more embodiments, the digital data repositories 304 store data associated with compliance management. In the example depicted in FIG. 3A, the digital data repositories 304 store compliance initiatives 305 that include control actions 310, evidence objects 307 and associated linking data 307, gap rules 312, inventories 313 of data objects 314, and system requirements frameworks 306 that each include controls 308. A compliance initiative 305 is a data structure specifying parameters for a compliance determination. For example, FIG. 3B below illustrates an embodiment of a compliance initiative 305a represented by one or more data objects stored in the digital data repositories 304 of FIG. 3A. As illustrated in FIG. 3A, each of the compliance initiatives 305 includes a set of one or more control actions 310. In particular, the control actions 310 include information associated with installing controls for complying with a system requirements framework.

A system requirements framework 306 is a digital representation of a requirements framework used to assess operations of an entity (e.g., a regulatory framework, a framework recommending best practices, a framework used for certification with privacy or security requirements, etc.). The compliance management computing system 102 can identify which of the system requirements frameworks 306 are applicable to operations of a given entity based on, for example, data types handled by computing systems or computing functions operated by the entity. Each system requirements framework 306 includes controls 308 indicating requirements for complying with the system requirements frameworks 306. Accordingly, a digital representation of a particular framework includes one or more files indicating required controls for complying with the framework.

In one or more embodiments, the digital data repositories 304 also include gap rules 312 associated with the system requirements frameworks 306. In particular, the gap rules 312 include rules for determining whether a configuration gap exists relative to a particular system requirements framework. For example, the compliance management computing system 102 determines the gap rules 312 based on the control actions 310 (and the corresponding controls 308) for the system requirements frameworks 306. The compliance management computing system 102 determines each gap rules set for identifying configuration gaps that should be addressed for an entity to be compliant with a corresponding system requirements framework. In some embodiments, configuration gaps include indications of control actions for implementing controls to comply with the corresponding system requirements framework. Specifically, a configuration gap indicates that the compliance management computing system 102 was unable to determine that a control of a requirements framework has been implemented. In one example, the configuration gap indicates that the compliance management computing system 102 cannot identify sufficient evidence of the control being installed in relation to a particular data object (e.g., in relation to a corresponding data asset or data processing operation) according to a particular gap rule (e.g., an attribute value was not acceptable or an attribute value was missing).

FIG. 3A also illustrates that the digital data repositories 304 include information associated with data objects 314. For example, the information associated with the data objects 314 includes indications of data assets, data processing operations, and/or elements of an entity that handle specific types of data covered by the system requirements frameworks 306. To illustrate, the information associated with the data objects 314 includes identifying information for individual digital assets and/or data processing operations, device identifiers, application identifiers, scripts, programs, entity identifiers, sub-entity identifiers, etc.

In additional embodiments, the digital data repositories 304 store attribute values 316 associated with the data objects 314 in an inventory 313. Specifically, the digital data repositories 304 store attribute values 316 of the data objects 314 associated with various attributes/characteristics of the data objects 314. For example, the attribute values 316 include details that can be used for determining compliance of the functions or infrastructure represented by the data objects 314 with the system requirements frameworks 306. To illustrate, the attribute values 316 indicate location data, implementation details associated with various controls, operational details associated with the data objects 314, or other information associated with the data objects 314 that the compliance management computing system 102 utilizes in determining compliance with the system requirements frameworks 306. As an example, an attribute of a data object, such as a data object representing a database, may include the type of encryption used for encrypting sensitive data stored in the database, or a type of access control for granting data processing access to the sensitive data.

The compliance management computing system 102 can also use evidence objects 307 to determine compliance with a system requirements framework 306. An evidence object 307 is a data object used by the compliance management computing system 102 to track collection of evidence that one or more controls have been implemented. For instance, a system requirements framework may require that a control's implementation must be proven or documented using certain evidence. The evidence could be, for example, a document such as a SOC 2 or ISO 27001 certificate indicating that controls from the SOC 2 or ISO 27001 framework have been implemented. In the compliance management computing system 102, the evidence object 307 includes various attributes regarding these evidence collection requirements and practices.

An illustrative example of an evidence object 307 is described in Table 1 below. Other implementations, however, are possible.

TABLE 1

| Attribute | Description |
| --- | --- |
| Evidence_Task_Class | An identifier for tracking a particular type of evidence task within the compliance management computing system 102, which can be used to link evidence tasks to multiple controls. In the additional example below, a simplified identifier (e.g., "ET_1") is used for illustrative purposes. |
| Evidence_Task_Name | A user-facing Evidence_Task_Name, such as "role based access needs," that could be presented to an end user via a suitable interface. |

TABLE 1-continued

| Attribute | Description |
| --- | --- |
| Evidence_Description | A user-facing narrative description, such as the type of documentation to be collected and explanatory examples of the documentation, that could be presented to an end user via a suitable interface. |
| Evidence_Object_Identifier | An identifier for tracking a particular instance of the data object within the compliance management computing system 102. For instance, an Evidence_Object_Identifier could be a UUID (e.g., "123e4567-e89b-12d3-a456-426614174000"). |
| Collection_Date | Data identifying a date on which the documentation was collected. This attribute would have an empty or null value if, for example, no documentation has been uploaded or otherwise retrieved for the evidence task represented by the evidence object 307. |
| Evidence_Type | Indicates whether the evidence is a link, a file, or a note. |
| Evidence_Location | If the evidence is a file, this could be a pointer, address, or other identifier of a location in a data source where the documentation. For instance, if a document is uploaded as evidence for the evidence task, the document itself may be stored in a database. The evidence task can identify the location of the document within that database. |
| Evidence_Task_Status | State or description indicating whether the evidence has been collected. For instance, if the Evidence_Location is empty (i.e., no evidence has been collected) or the Collection_Date is outside the observation period specified in a compliance initiative. |

In some embodiment, an evidence object 307 can also include one or more attributes storing integration data. The integration data can include information used by the compliance management computing system 102 to query a third-party software application or data source for evidence. Examples of attributes storing integration data include an identifier of a data source, credentials for accessing the data source, query parameters used to search the data source for relevant evidence, etc.

The compliance management computing system 102 can re-use (or "share") evidence objects 307 across multiple controls and/or multiple compliance initiatives. For instance, the compliance management computing system 102 can access, from one or more digital data repositories 304, linking data 309 that identifies relationships (or "links") among evidence task classes and controls. In some embodiments, a database or other data structure could include records of these links between evidence task classes and control numbers.

Table 2 depicts a simplified, illustrative example of linking data 309 that links evidence task classes and controls, where each link record identifies a relationship between an evidence task class and a control.

TABLE 2

| Link Record Number | Evidence_Task_Class | Control Identifier | Framework |
| --- | --- | --- | --- |
| 12341 | ET_1 | CA1 | SOC2 |
| 12342 | ET_1 | CB3 | PCI-DSS |
| 12343 | ET_1 | CC7 | ISO 27001 |
| 12344 | ET_2 | CA9 | SOC2 |
| 12345 | ET_2 | CB10 | PCI-DSS |
| 12346 | ET_2 | CD11 | NIST |

Table 2 includes two evidence task classes (ET_1 and ET_2), and also includes two controls (CA1 and CA9) from a first system requirements framework (SOC2), two controls (CB1 and CB10) from a second system requirements framework (PCI-DSS), one control (CC7) from a third system requirements framework (ISO 27001), and one control (CC11) from a fourth system requirements framework (NIST). As depicted in Table 2, a first evidence task class (ET_1) is linked to a first set of controls (CA1, CB3, CC7) and their respective frameworks (SOC2, PCI-DSS, ISO 27001), and a second evidence task class (ET_1) is linked to a second set of controls (CA9, CB10, CD11) and their respective frameworks (SOC2, PCI-DSS, NIST).

The compliance management computing system 102 can use linking data 309 linking evidence task classes and controls to determine that multiple controls in a compliance initiative are implemented. For instance, the compliance management computing system 102 can determine that a control CA1 has been implemented for the compliance initiative. In particular, the compliance management computing system 102 identifies an evidence object 307 with Evidence_Task_Class=ET_1, which is linked to control CA1 in Table 2, and determines that the evidence object 307 has an Evidence_Task_Status value indicating that that evidence has been collected and a Collection_Date value identifying a date within an observation period specified in the compliance initiative. Furthermore, the compliance management computing system 102 can reference the table above to identify other controls, CB3 and CC7, to which the evidence object 307 with class ET_1 applies. For any of these controls that are associated with the compliance initiative, the compliance management computing system 102 can update the compliance initiative to indicate that the controls are implemented because the same evidence object 307 showing implementation of the control CA1 also shows implementation of controls CB3 and CC7.

In some embodiments, the compliance management computing system 102 can use, in a compliance initiative, a particular evidence object 307 that was instantiated for a prior compliance initiative. For instance, as discussed herein, the compliance management computing system 102 can update the current compliance initiative to identify a set of controls associated with the compliance initiative (e.g., by adding control actions specifying controls to the compliance initiative). The compliance management computing system 102 can automatically assess whether these controls have been implemented using a data source storing "shared" evidence objects 307 (e.g., evidence objects 307 accessible to multiple compliance initiatives). In an illustrative example, the compliance management computing system 102 searches linking data 309 linking evidence task classes and controls (e.g., Table 2) to find evidence task classes that are linked to the set of controls in the current compliance initiative. For instance, if a compliance initiative includes controls CA1, CA9, CC7, and CD11, the compliance management computing system 102 can determine that evidence objects 307 with Evidence_Task_Class=ET_1 and Evidence_Task_Class=ET_2 are potentially applicable to the compliance initiative. The compliance management computing system 102 can then query a data source containing "shared" evidence objects 307 for any evidence objects 307 with Evidence_Task_Class=ET_1 and Evidence_Task_Class=ET_2 and a Collection_Date value indicating a date within the observation period specified by the current compliance initiative. The compliance management computing system 102 can receive any evidence objects 307 matching the query, and use these evidence objects 307 to identify the linked controls as "implemented" in the compliance initiative.

Figure 3B:
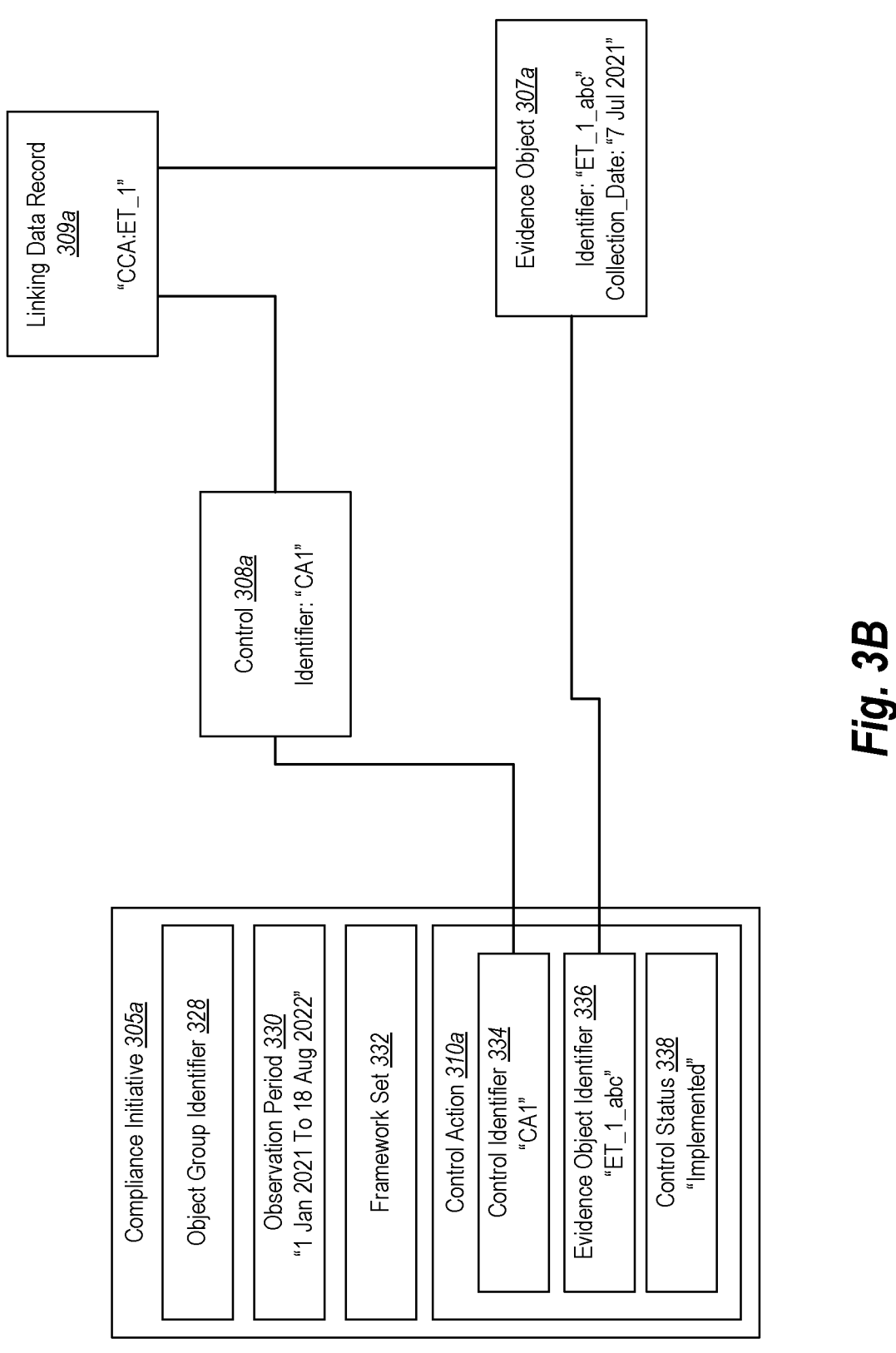
FIG. 3B illustrates an example of relationships between a compliance initiative, controls and evidence objects in a digital data repository of FIG. 3A in accordance with one or more embodiments.

FIG. 3B provides an example of relationships among compliance initiatives, controls, and evidence objects according to the data stored in the digital data repositories 304 of FIG. 3A. In FIG. 3B, the parameters of the compliance initiative 305a include an object group identifier 328, an observation period 330, and a framework set 332 identifying one or more system requirements frameworks. The object group identifier 328 can identify a particular inventory 313 of data objects 314 used to determine compliance with one or more system requirements framework in the framework set. For instance, if the object group identifier 328 identifies a particular legal entity, the compliance management computing system 102 selects an inventory of data objects that identify the same entity (or that are linked to data objects identifying the entity) in order to perform a compliance determination.

Parameters of the compliance initiative 305a can also include sets generated by the compliance management computing system, such as a control action set including a control action 310a. The control action 310a includes at least one control identifier 334, which identifies a control (e.g., control number CA1) to be implemented for compliance with a system requirements framework from the framework set 332. The control action 310a also includes at least one evidence object identifier 336, which identifies an evidence object for tracking evidence that demonstrates implementation of the control specified by the control identifier 334. In one or more embodiments, the compliance management computing system 102 utilizes multiple evidence object identifiers 336 can be included if a control requires different pieces of evidence to show implementation.

As depicted in FIG. 3B, the compliance management computing system 102 can populate the compliance initiative 305a using linking data. For instance, the compliance management computing system 102 determines a linking data record 309a that indicates that the control 308a is linked to the evidence task class of the evidence object 307a. The compliance management computing system 102 can therefore update the evidence object identifier 336 with an identifier of the evidence object 307a, which has a collection date (7 Jul. 2021) falling within the specified observation period 330 (1 Jan. 2021 to 7 Jul. 2022). Furthermore, the compliance management computing system 102 can set the control status 338 to "implemented" because the evidence object 307a is applicable to the control 308a and has a collection date falling within the specified observation period 330.

As mentioned, the compliance management computing system 102 includes a plurality of subsystems for performing various operations associated with compliance management for an entity. In one or more embodiments, the compliance management computing system 102 utilizes the subsystems to perform operations in a plurality of stages associated with compliance management. To illustrate, the compliance management computing system 102 utilizes the subsystems to implement a planning stage, a data extraction stage, an analyzing stage, and execution stage, and a completing stage.

According to one or more embodiments, the compliance management computing system 102 implements the planning stage by generating an initiative (e.g., a plan to verify/improve compliance) to determining configuration gaps associated with functions or infrastructure (represented by the data objects 314) that target data subject to the system requirements frameworks 306. More specifically, the compliance management computing system 102 implements the planning stage via an onboarding process for the entity and an initiative generation process. In one or more embodiments, the compliance management computing system 102 includes an onboarding subsystem 318 that performs operations for onboarding an entity into a compliance management service for managing compliance of functions or infrastructure of the entity with one or more system requirements frameworks. To illustrate, the onboarding subsystem 318 communicates with the third-party computing systems 300 to obtain an indication from the entity of one or more system requirements frameworks with which the entity is required to comply. Additionally, the onboarding subsystem 318 can access a library containing additional data associated with the system requirements frameworks, such as controls, control actions, and/or gap rules corresponding to the system requirements frameworks.

In one or more embodiments, the compliance management computing system 102 also includes an initiative subsystem 320 for generating an initiative during the planning stage for analyzing an entity's compliance relative to a given system requirements framework selected for the initiative. For example, the initiative subsystem 320 receives an indication of one or more selected system requirements frameworks for analyzing the entity's compliance for the initiative. To illustrate, the selected system requirements framework(s) include all system requirements frameworks indicated during onboarding of the entity. Alternatively, the selected system requirements framework(s) include a subset of the system requirements frameworks associated with the entity (e.g., indicated during onboarding). In connection with identifying the system requirements frameworks for the initiative, the initiative subsystem 320 also determines the corresponding controls and control actions for the selected system requirements frameworks.

In particular, the compliance management computing system 102 determines data objects associated with the entity to analyze in connection with the initiative. For instance, the compliance management computing system 102 communicates with the third-party computing systems 300 to determine which data objects associated with the entity to analyze in connection with the initiative. In response to determining the system requirements framework(s), controls, control actions, gap rules, and/or data objects associated with the initiative, the initiative subsystem 320 can store the initiative (and corresponding data) in the digital data repositories 304. In some embodiments, the compliance management computing system 102 stores information associated with the initiative with indications (e.g., pointers) of the system requirements frameworks 306, the controls 308, the control actions 310, the gap rules 312, the data objects 314 of the inventory 313, the evidence objects 307, and/or the linking data 309 stored in the digital data repositories 304.

In one or more embodiments, the compliance management computing system 102 also includes an data extraction subsystem 322 to perform at least some operations during the data extraction stage. Specifically, the data extraction subsystem 322 accesses the digital data repositories 304 to obtain attribute values for the data objects corresponding to the initiative. For instance, the data extraction subsystem 322 accesses the attribute values 316 in the digital data repositories 304 to determine the attribute values of the indicated data objects.

In an illustrative example, the data extraction subsystem 322 includes a cloud-based system in combination with an on-premises system that work together to extract, determine, or otherwise obtain attribute values from one or more digital data repositories 304 and populate attributes of one or more data objects with the attribute values. For instance, the data extraction subsystem 322 could include software components in a cloud-based system (e.g., compliance management system 102) that are communicatively coupled with software components of an on-premises system, such as a client device 106 or other client system that can access digital data repositories 304 and/or third-party computing systems 110. This data extraction subsystem 322 includes automation and intelligence features for discovering and classifying data of interest (e.g., personal and non-personal data), including structured and/or unstructured data, stored across different software and hardware systems.

For instance, the on-premises system can include scanners or other software tools that integrate with a third-party computing systems 110 or otherwise connect to digital data repositories 304 in order to search structured and/or unstructured data of interest on the digital data repositories 304 and/or third-party computing systems 110. The on-premises system can obtain attribute values from, for example, metadata for various data sources in the digital data repositories 304 and/or from classifiers applied to the metadata or other data sampled from the data sources. The on-premises system can provide these attribute values to the cloud-based system, which can update data objects (e.g., data asset objects, data processing operation objects) with the obtained attribute values.

According to one or more embodiments, the compliance management computing system 102 includes an assessment subsystem 324 to optionally perform at least some operations during the data extraction stage. For example, in response to determining that one or more attribute values of data objects indicated in the initiative are missing, the compliance management computing system 102 can utilize the assessment subsystem 324 to obtain the missing attribute values. In particular, the assessment subsystem 324 determines which attributes of the data objects have missing values and generates and executes an assessment to obtain the missing attribute values. In some embodiments, the assessment includes a computer-implemented questionnaire with one or more electronic survey questions for display at one or more client devices (e.g., associated with personnel associated with the entity) to obtain the missing attribute values.

In one or more embodiments, the assessment subsystem 324 generates the computer-implemented questionnaire and stores the questionnaire in the digital data repositories 304. The digital data repositories 304 can include a data structure that links system requirements frameworks 306 (e.g., the digital representations) to the controls 308, the control actions 310, and the gap rules 312 to the attribute values 316 (e.g., via the data objects 314). Accordingly, the assessment subsystem 324 can utilize the data structure to determine specific questions to include in the questionnaire based on the attributes identified for the initiative (e.g., based on the corresponding data objects). The assessment subsystem 324 can also dynamically modify the questionnaire to present questions to respondents based on answers to previous questions, thus minimizing the number of questions to obtain a particular missing attribute value.

According to one or more embodiments, the assessment subsystem 324 utilizes one or more additional assessment types to obtain missing attribute values. For example, the assessment subsystem 324 can execute a query on a database (e.g., other than the digital data repositories 304) to obtain one or more missing attribute values. To illustrate, the database can include a private database, a publicly accessible website, the third-party computing systems 300, or one or more additional computing systems/devices. The assessment subsystem 324 can also acquire the missing values by generating and sending an electronic communication (e.g., text, email, fillable form) to obtain one or more missing attribute values.

As illustrated in FIG. 3, the compliance management computing system 102 also includes a configuration gap subsystem 326 to determine configuration gaps for the initiative. Specifically, the configuration gap subsystem 326 utilizes a gap rules set associated with the initiative to determine whether the functions or infrastructure represented by the indicated data objects are in compliance with the corresponding system requirements framework(s). For example, the configuration gap subsystem 326 can determine compliance by applying the gap rules set to the attribute values identified for the corresponding data objects. To illustrate, the configuration gap subsystem 326 compares the attribute values to acceptable/relevant attribute values indicated by the gap rules set to determine whether each indicated data object has installed a particular control corresponding to the system requirements framework(s). The configuration gap subsystem 326 can also provide the identified configuration gaps for display via a graphical user interface of a client device.

In one or more additional embodiments, the configuration gap subsystem 326 generates or otherwise determines one or more tasks associated with the identified configuration gaps. For example, the configuration gap subsystem 326 determines tasks that correspond to the controls and/or the control actions of the system requirements framework(s) of the initiative so that the entity (e.g., a computing system of the entity or personnel associated with the entity) installs the corresponding controls via the control actions. In addition, the configuration gap subsystem 326 can assign the one or more tasks to specific users and/or computing systems for completion. In some embodiments, the configuration gap subsystem 326 also tracks performance of the various tasks to determine whether the tasks are completed to address the configuration gaps.

In one or more embodiments, the compliance management computing system 102 utilizes a compliance initiative to implement changes at one or more computing systems of a third-party system. For example, the compliance management computing system 102 integrates with the third-party systems 300 to gain access to data at the third-party computing systems 300 in connection with obtaining information associated with the data objects 314, the evidence objects 307, etc. To illustrate, as mentioned, the compliance management computing system 102 can execute a compliance management process using a compliance initiative to determine whether controls are installed at the third-party computing systems 300 according to a particular system requirements framework.

Additionally, the compliance management computing system 102 can have permissions to implement one or more modifications to the third-party computing systems 300 based on the compliance initiative. To illustrate, the third-party computing systems 300 can grant permissions to the compliance management computing system 102 to make changes to files at the third-party computing systems 300 according to the compliance initiative. As an example, the third-party computing systems 300 can grant permissions to the compliance management computing system 102 to modify an encryption associated with a dataset in accordance with a system requirements framework. Additionally, the third-party computing systems 300 can grant permissions to the compliance management computing system 102 to purge a database after a specific time period in accordance with a system requirements framework. Furthermore, the third-party computing systems 300 can automatically retrieve and evaluate a data authorization list as part of a routinely executed script or program in accordance with a system requirements framework.

Accordingly, the compliance management computing system 102 can perform one or more operations to modify data assets or data processing operations in connection with a compliance initiative. In particular, in response to detecting one or more configuration gaps for a compliance initiative, the compliance management computing system 102 can modify files or functions of a computing device to bring the computing device in compliance with a corresponding system requirements framework. As an example, in response to determining that a database does not have the correct encryption for a specific dataset (e.g., according to PCI DSS requirements), the compliance management computing system 102 can access the dataset (e.g., via execution of a script or program at the database) to automatically update the encryption for the dataset. In additional embodiments, in response to detecting a configuration gap, the compliance management computing system 102 can generate an option to correct the configuration gap for display at a client device, and in response to a user input selecting the option, execute instructions to modify a corresponding data asset or data processing operation at one or more third-party computing systems to correct the configuration gap.

Figure 4:
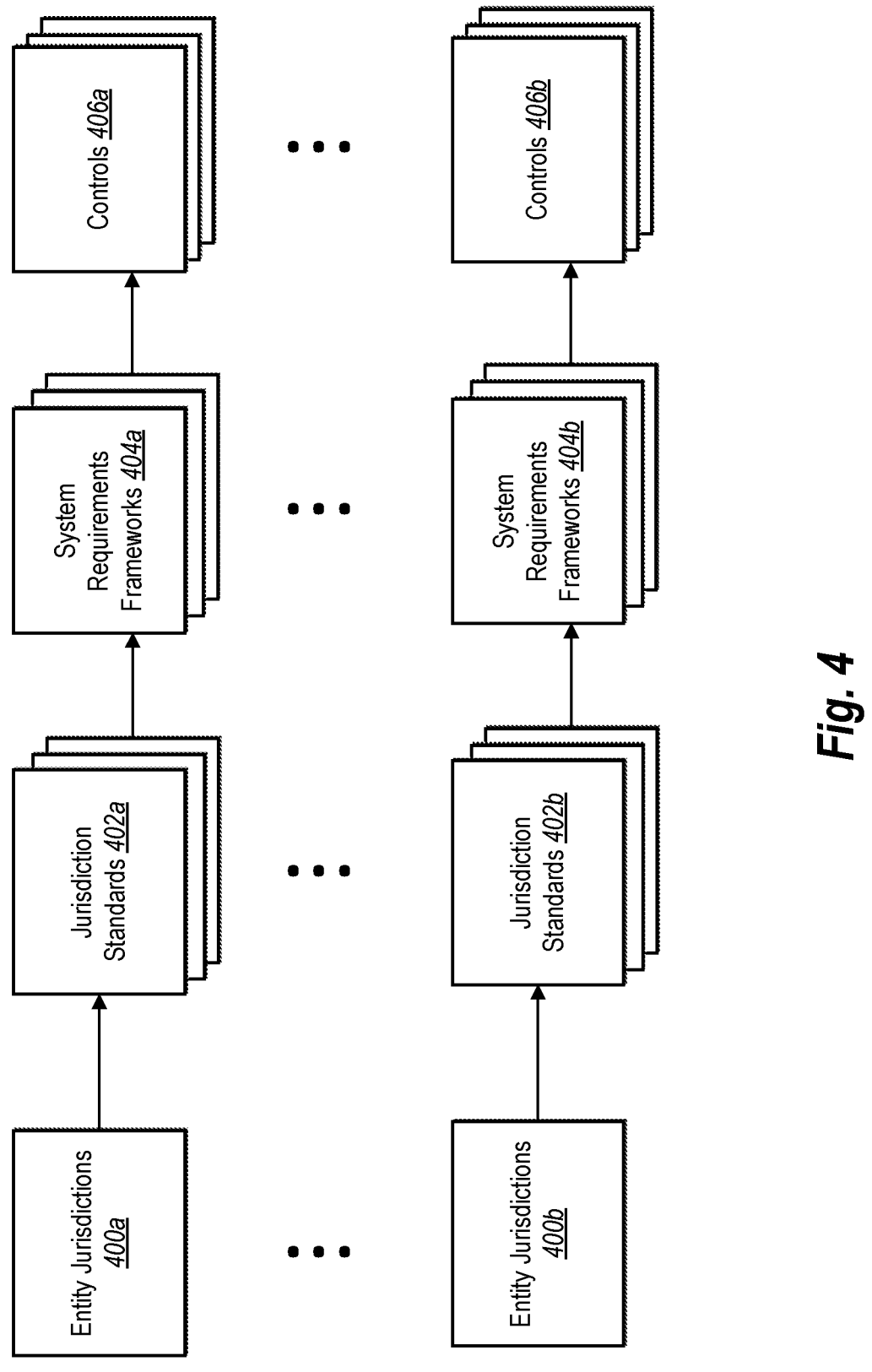
FIG. 4 illustrates an example of an overview of the compliance management computing system determining system requirements frameworks and corresponding controls for different standards in accordance with one or more embodiments.

As mentioned, the compliance management computing system 102 can perform an onboarding process for onboarding an entity to the compliance management computing system 102 for managing compliance of the entity. FIG. 4 illustrates an example of an overview of the compliance management computing system 102 determining information associated with various elements of the onboarding process. Specifically, FIG. 4 illustrates that the compliance management computing system 102 determines data that the compliance management computing system 102 can use to establish/set up the entity for performing compliance management operations (e.g., by setting up a profile for the entity during an onboarding process).

In one or more embodiments, the compliance management computing system 102 provides, via one or more graphical user interfaces, tools to obtain specific data associated with the entity. For example, the compliance management computing system 102 determines one or more jurisdictions in which the entity operations. More specifically, a jurisdiction can include a geographic location or a field of operation in which the entity operates, such as being involved with the medical field, engineering field, legal field, etc. To illustrate, the compliance management computing system 102 determines a first entity jurisdiction 400a and a second entity jurisdiction 400b.

According to one or more embodiments, as illustrated in FIG. 4, the compliance management computing system 102 determines, during the onboarding stage, one or more jurisdiction regulations associated with each jurisdiction specified by the entity. In particular, the compliance management computing system 102 determines, for each jurisdiction indicated by an entity, jurisdiction regulations corresponding to an entity in response to an indication that the entity operates within a specific geographic field and/or in a specific field of operation. For example, the compliance management computing system 102 determines a first set of jurisdiction regulations 402a corresponding to the first entity jurisdiction 400a and a second set of jurisdiction regulations 402b corresponding to the second entity jurisdiction 400b. To illustrate, the first entity jurisdiction 400a may have a first set of laws or regulations corresponding to a first geographical location and/or field of operation, and the second entity jurisdiction 400b may have a second set of laws or regulations corresponding to a second geographical location and/or field of operation.

Furthermore, the compliance management computing system 102 determines, for each jurisdiction regulation, a system requirements framework. Specifically, the compliance management computing system 102 determines requirements for handling specific data types based on the corresponding laws/regulations of the corresponding jurisdiction. The compliance management computing system 102 can thus generate/determine a digital representation of the requirements for handling the specific data types. Accordingly, as illustrated in FIG. 4, the compliance management computing system 102 determines first system requirements frameworks 404a corresponding to the first set of jurisdiction regulations 402a and second system requirements frameworks 404b corresponding to the second set of jurisdiction regulations 402b.

In connection with determining the requirements indicated by each system requirements framework, the compliance management computing system 102 determines controls required to comply with the system requirements frameworks. For example, as illustrated in FIG. 4, the compliance management computing system 102 determines first sets of controls 406a based on the first system requirements frameworks 404a and second sets of controls 406b based on the second system requirements frameworks 404b. Additionally, the compliance management computing system 102 determines corresponding control actions associated with the controls for each of the system requirements frameworks. More specifically, the compliance management computing system 102 determines any control actions for installing the appropriate controls for each of the system requirements frameworks in each jurisdiction.

As an example, the compliance management computing system 102 determines that an entity operates in a jurisdiction that corresponds to the PCI DSS system requirements framework that covers handling of credit card data by entities involved in processing credit card transactions. In particular, the compliance management computing system 102 determines that the PCI DSS system requirements framework defines a plurality of controls required to be installed for compliance with the standard. To illustrate, the compliance management computing system 102 determines that one such control is establishing firewalls and web filtering to protect cardholder data. For example, a control action for establishing firewalls includes fully documenting and implementing all key-management processes and procedures for cryptographic keys used for encryption of cardholder data. Thus, according to one or more embodiments, the compliance management computing system 102 determines control actions applicable to the entity's handling of the target data for each of the system requirements frameworks. In one or more embodiments, the compliance management computing system 102 stores information from the onboarding stage in a profile for the entity, an oversight entity associated with the entity, or for a plurality of entities.

In one or more embodiments, the compliance management computing system 102 determines information associated with one or more jurisdiction regulations and/or system requirements frameworks for an entity based on previously stored information. For example, the compliance management computing system 102 can store information for various system requirements frameworks and corresponding controls and control actions. Accordingly, in response to receiving an indication that the entity operates within a particular jurisdiction and/or subject to certain jurisdiction regulations, the compliance management computing system 102 determines the corresponding system requirements framework(s), controls, and/or control actions based on the previously stored information. Thus, the compliance management computing system 102 can obtain such information without requiring the entity (e.g., a user associated with the entity) to provide such information to the compliance management computing system 102 during the onboarding process.

Figure 5:
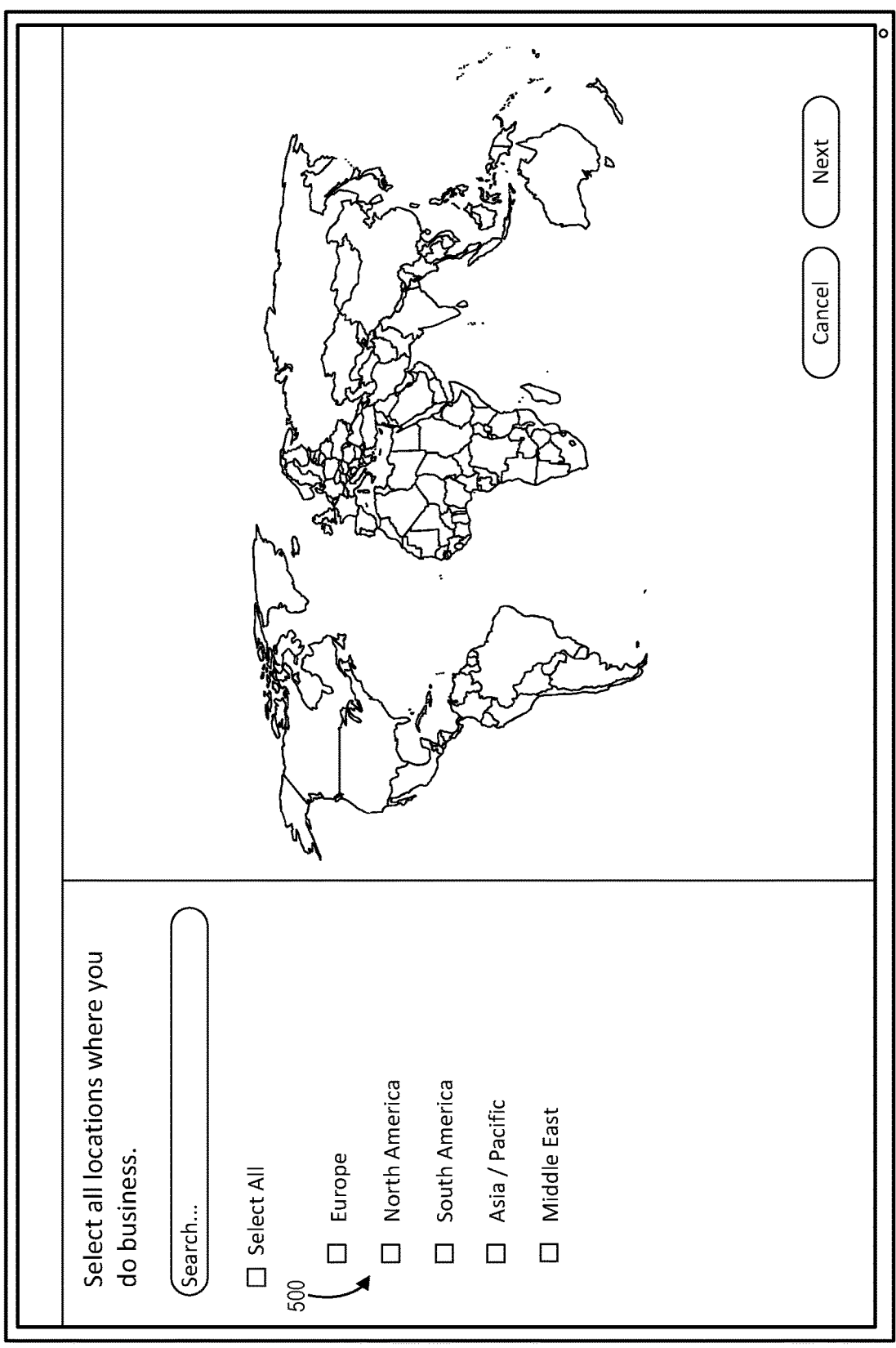
FIGS. 5-7 illustrate examples of graphical user interfaces for selecting locations, regulations, and applicable system requirements frameworks during onboarding of an entity in accordance with one or more embodiments.
Figure 6:
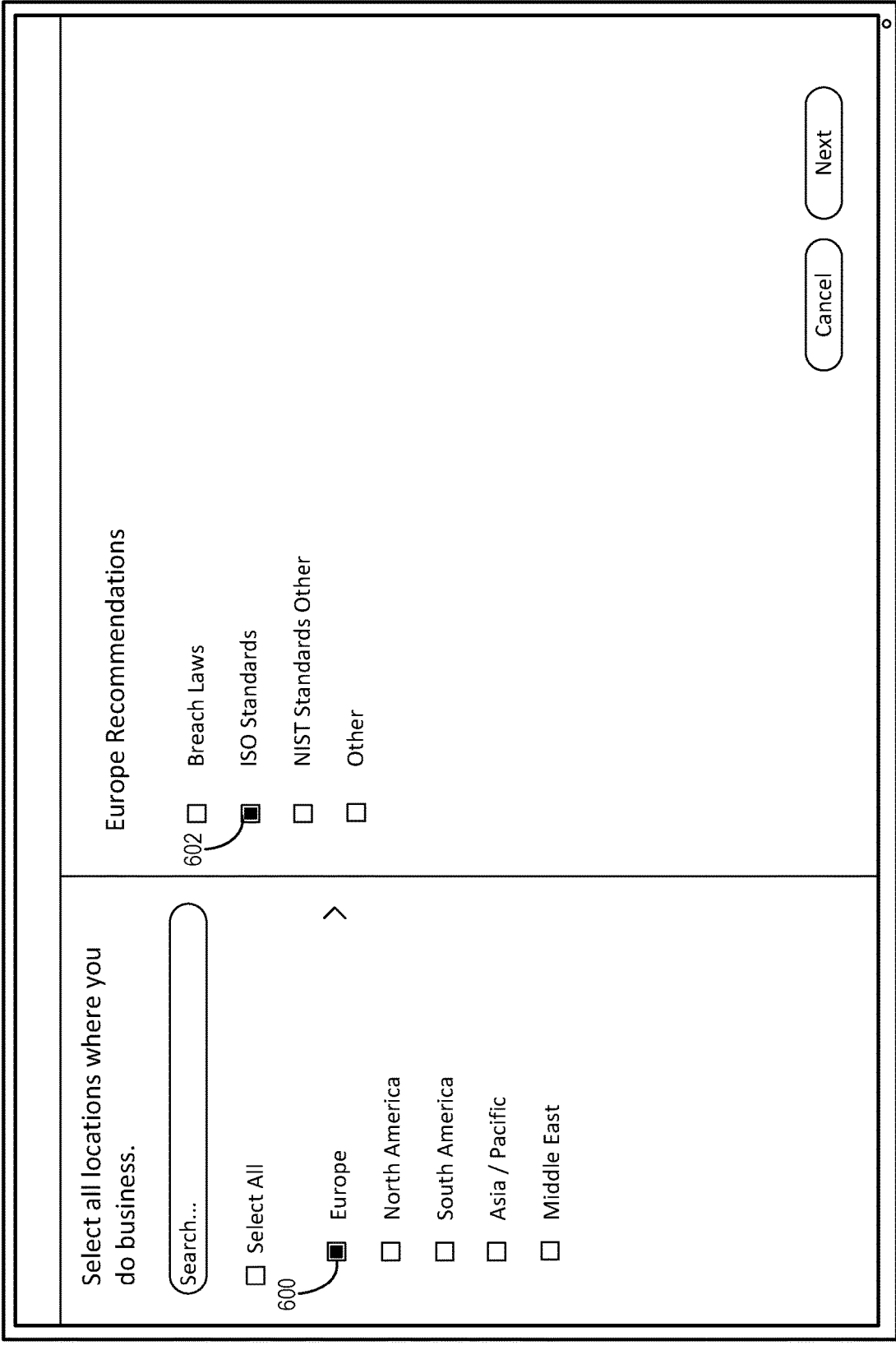
Figure 7:
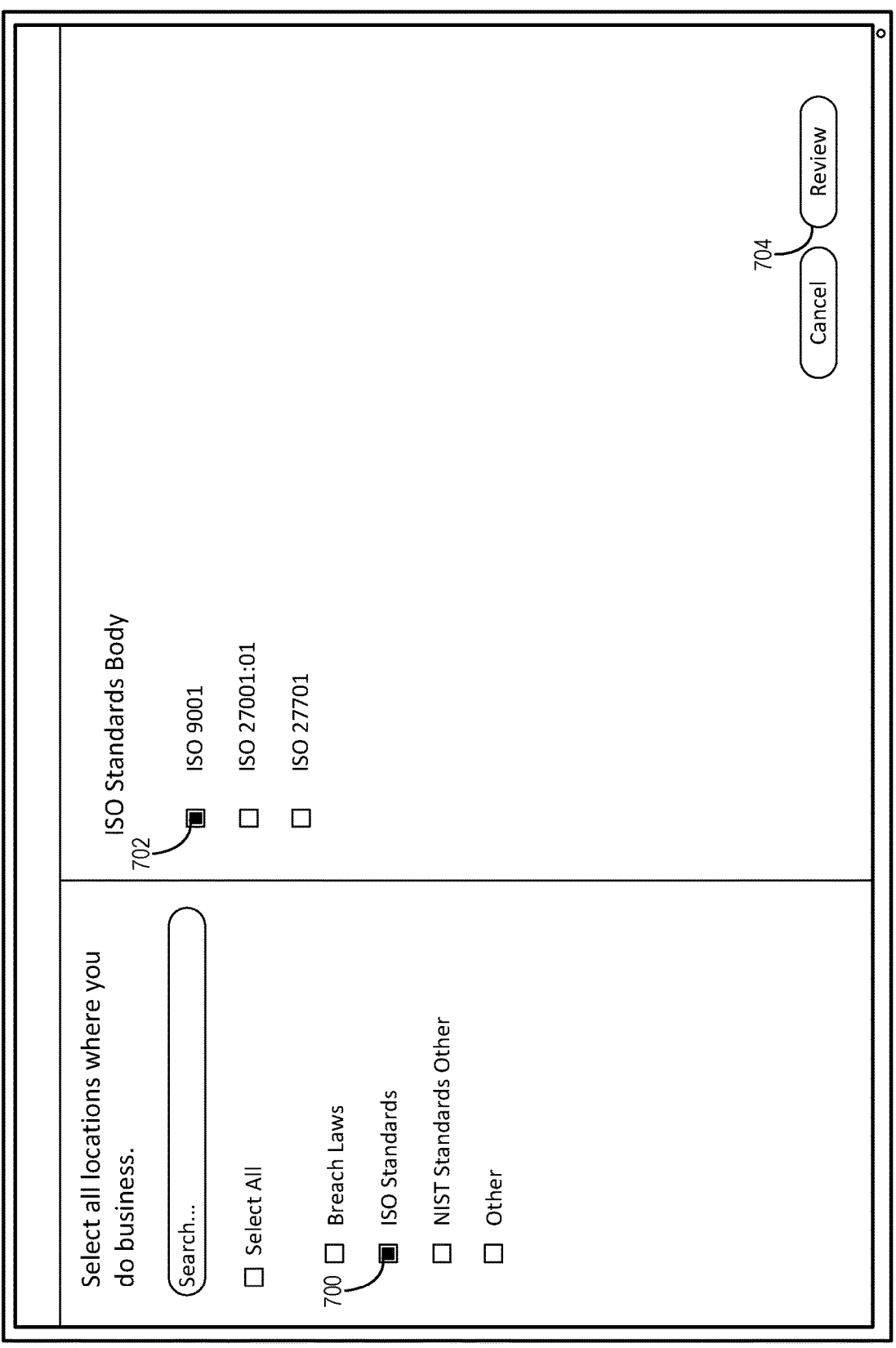

FIGS. 5-7 illustrate example graphical user interfaces for onboarding an entity during an onboarding stage. Specifically, FIGS. 5-7 illustrate that a client device includes a client application associated with the compliance management computing system 102. For example, the compliance management computing system 102 provides, for display on the client device via the client application, tools for onboarding the entity by providing tools to provide information as described in relation to FIG. 4 above. To illustrate, the client application provides tools to indicate one or more jurisdictions, regulations, and/or system requirements frameworks.

To illustrate, FIG. 5 illustrates an example graphical user interface including tools to indicate one or more locations. For example, the client device displays a list of selectable locations 500 in which an entity can operate. To illustrate, the list of selectable locations 500 includes continents from which a user operating the client device can select. Although FIG. 5 illustrates that the list of selectable locations 500 includes continents, the client device can alternatively display more granular locations, such as countries within a particular continent, states/provinces within a particular country, or counties. In additional embodiments, the compliance management computing system 102 provides options for selecting specific jurisdictions, such as fields of practice/operation (e.g., health care, legal). Additionally, the compliance management computing system 102 can provide tools to allow for selecting a plurality of different types of jurisdictions, such as one or more locations and one or more fields of operation.

In connection with selecting one or more locations or jurisdictions, the compliance management computing system 102 can also provide tools for selecting specific regulations that may be applicable to an entity. FIG. 6 illustrates a graphical user interface within a client application of a client device for selecting one or more regulations to which an entity may be subject based on the types of data the entity handles. For example, the compliance management computing system 102 can detect a selected location 600 (e.g., based on a selection via the graphical user interface of FIG. 5). In response to determining the selected location 600, the compliance management computing system 102 provides, for display via the graphical user interface, a list of regulations (including laws or other standards) that correspond to the selected location 600 according to one or more regulatory bodies associated with the selected location 600. Furthermore, as illustrated in FIG. 6, the compliance management computing system 102 can detect one or more selected regulations (e.g., a selected regulation 602 such as "ISO Standards") from the list of regulations.

FIG. 7 illustrates a graphical user interface within a client application of a client device for selecting one or more system requirements frameworks corresponding to a selected regulation. For instance, in response to detecting a selected regulation (e.g., the selected regulation 700), the compliance management computing system 102 provides a list of system requirements frameworks associated with the selected regulation. To illustrate, in connection with the selected regulation 700 (e.g., "ISO Standards"), the compliance management computing system 102 determines and provides one or more possible system requirements frameworks associated with the selected regulation 700.

In at least some embodiments, a given regulation includes a plurality of different possible system requirements frameworks that each correspond to a different set of controls for different data types and/or different approaches to meeting the specific requirements of the regulation. For example, selecting the ISO Standards regulation causes the client device to display a plurality of different system requirements frameworks under ISO Standards (e.g., "ISO 9001," "ISO 27001:01," etc.). The compliance management computing system 102 can detect one or more selected system requirements frameworks (e.g., the selected system requirements framework 702).

Accordingly, the compliance management computing system 102 determines locations/jurisdictions, regulations, and system requirements frameworks during the onboarding stage. The compliance management computing system 102 can also determine the corresponding controls/control actions based on the selected system requirements frameworks. In one or more embodiments, the client device displays a review option 704 that, upon selection, causes the client device to display the selected location(s), selected regulation(s), and selected system requirements framework(s). Additionally, the compliance management computing system 102 can provide an option to confirm the selected information after review.

In one or more embodiments, the compliance management computing system 102 also provides tools for specifying controls and/or control actions associated with the selected system requirements frameworks. For example, a user of the client device may determine that a particular control or control action is not applicable to the entity. To illustrate, the user may determine that the entity does not maintain a public website for handling specific data types, so a control action involving providing visitors to a website with the ability to opt out of receiving cookies is not applicable to the entity. Accordingly, the user can interact with the client device to deselect the corresponding control/control action. Similarly, the compliance management computing system 102 can provide tools for adding additional controls (e.g., from a different system requirements framework or a custom control).

Figure 8:
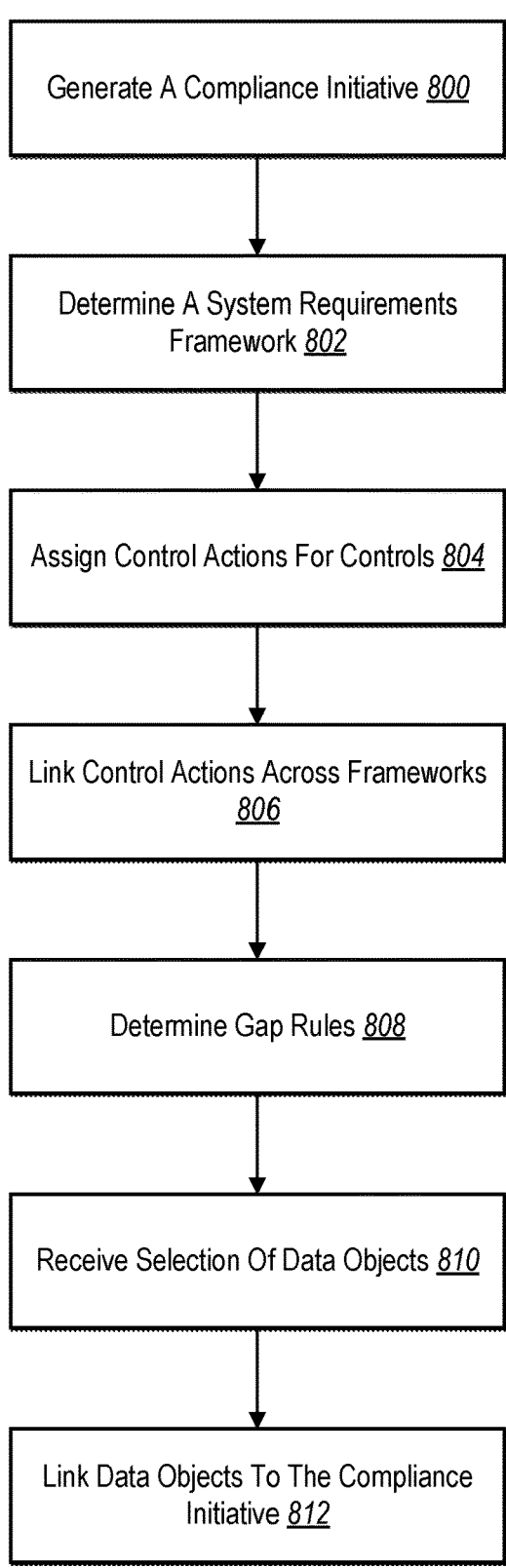
FIG. 8 illustrates a flowchart of a process for generating a compliance initiative for an inventory of data objects in accordance with one or more embodiments.

FIG. 8 illustrates an example process in which the compliance management computing system 102 performs a plurality of operations in connection with generating an initiative associated with one or more system requirements frameworks. For example, as illustrated in FIG. 8, the compliance management computing system 102 performs an act 800 of generating a compliance initiative in response to a request to generate the compliance initiative. To illustrate, a client device associated with an entity can detect a selection to generate the compliance initiative to review compliance of the entity.

The compliance management computing system 102 (e.g., via the initiative subsystem 320 of FIG. 3) generates the compliance initiative by generating an entry in a database associated with the initiative. In some embodiments, the compliance management computing system 102 also accesses a digital data repository to obtain data previously stored for the entity. To illustrate, the compliance management computing system 102 accesses data stored for the entity during onboarding of the entity. The compliance management computing system 102 can utilize such information to efficiently prepare the initiative for execution.

In one or more embodiments, as illustrated in FIG. 8, the compliance management computing system 102 performs an act 802 of determining a system requirements framework for the compliance initiative. For example, the compliance management computing system 102 receives a selection of a specific system requirements framework for determining whether the entity is in compliance with the system requirements framework. Additionally, in connection with the selected system requirements framework, the compliance management computing system 102 performs an act 804 of assigning control actions for controls associated with the system requirements framework. To illustrate, the compliance management computing system 102 accesses the data previously provided during the onboarding stage to determine the controls and control actions associated with the system requirements framework.

According to one or more embodiments, the compliance management computing system 102 determines whether one or more of the control actions associated with the initiative correspond to one or more other system requirements frameworks. Specifically, the compliance management computing system 102 can store information associated with crosswalks (e.g., data overlaps) between different system requirements frameworks and/or different compliance initiatives. In connection with assigning control actions, the compliance management computing system 102 can also perform the act 806 of linking control actions across frameworks/initiatives. For example, the compliance management computing system 102 can utilize the stored information associated with the crosswalks between the frameworks/initiatives to determine that one or more control actions associated with a system requirements framework/initiative are applicable to a plurality of different system requirements frameworks/initiatives (or are similar to control actions of another system requirements framework). By detecting evidence of previously identified control actions for specific frameworks in one or more previous initiatives, the compliance management computing system 102 can more efficiently determine controls/control actions across different system requirements frameworks associated with a current compliance initiative.

As an example, a control action associated with a first system requirements framework can involve implementing a process for purging personal data within a specific number of days. A second system requirements framework may include a control action involving implementing a process for purging personal data. The compliance management computing system 102 can thus utilize information associated with the first system requirements framework (e.g., compliance of the entity with the first system requirements framework) to determine that the same control action is unnecessary for an initiative for the second system requirements framework.

As illustrated in FIG. 8, the compliance management computing system 102 also performs an act 808 of determining gap rules associated with the compliance initiative. For instance, the compliance management computing system 102 can determine a gap rules set based on assigned control actions. To illustrate, the compliance management computing system 102 determines gap rules that are related to control actions assigned to the compliance initiative to verify that corresponding controls are installed. In one or more embodiments, the compliance management computing system 102 determines the gap rules set from a digital data repository based on the assigned control actions and one or more links between the control actions and gap rules stored in the digital data repository. In additional embodiments, the compliance management computing system 102 determines one or more gap rules based on user input via a client device. As an example, the compliance management computing system 102 determines a gap rule indicating that a configuration gap exists if an entity—which has a website for collecting credit card information—has not implemented a firewall for the website according to a corresponding control action for the compliance initiative.

In one or more embodiments, the compliance management computing system 102 also performs an act 810 of receiving a selection of data objects. In particular, the compliance management computing system 102 receives an indication of data objects corresponding to the compliance initiative (e.g., data objects representing functions or infrastructure for handling data types subject to the system requirements framework). The compliance management computing system 102 may receive an upload of identifiers of the data objects (e.g., the entity, sub-entities, data assets, and/or data processing operations) from a client device at the time of selection. Alternatively, the compliance management computing system 102 may receive indications of data objects previously identified by the entity in connection with onboarding the entity or in connection with a previous compliance initiative. FIG. 8 also illustrates that the compliance management computing system 102 performs an act 812 of linking the data objects to the compliance initiative. In some embodiments, linking the data objects to the compliance initiative involves updating a suitable data object within the compliance initiative (e.g., an array) to include identifiers of the data objects. In additional or alternative embodiments, linking the data objects to the compliance initiative involves updating a linking dataset with a set of link records, where each link record has the identifier of the compliance initiative and a respective identifier of a data object linked to the compliance initiative. The compliance management computing system 102 further updates the compliance initiative by determining compliance of the functions or infrastructure of the entity, which are represented by data objects, with respect to the system requirements framework given the assigned control actions and gap rules.

Figure 9:
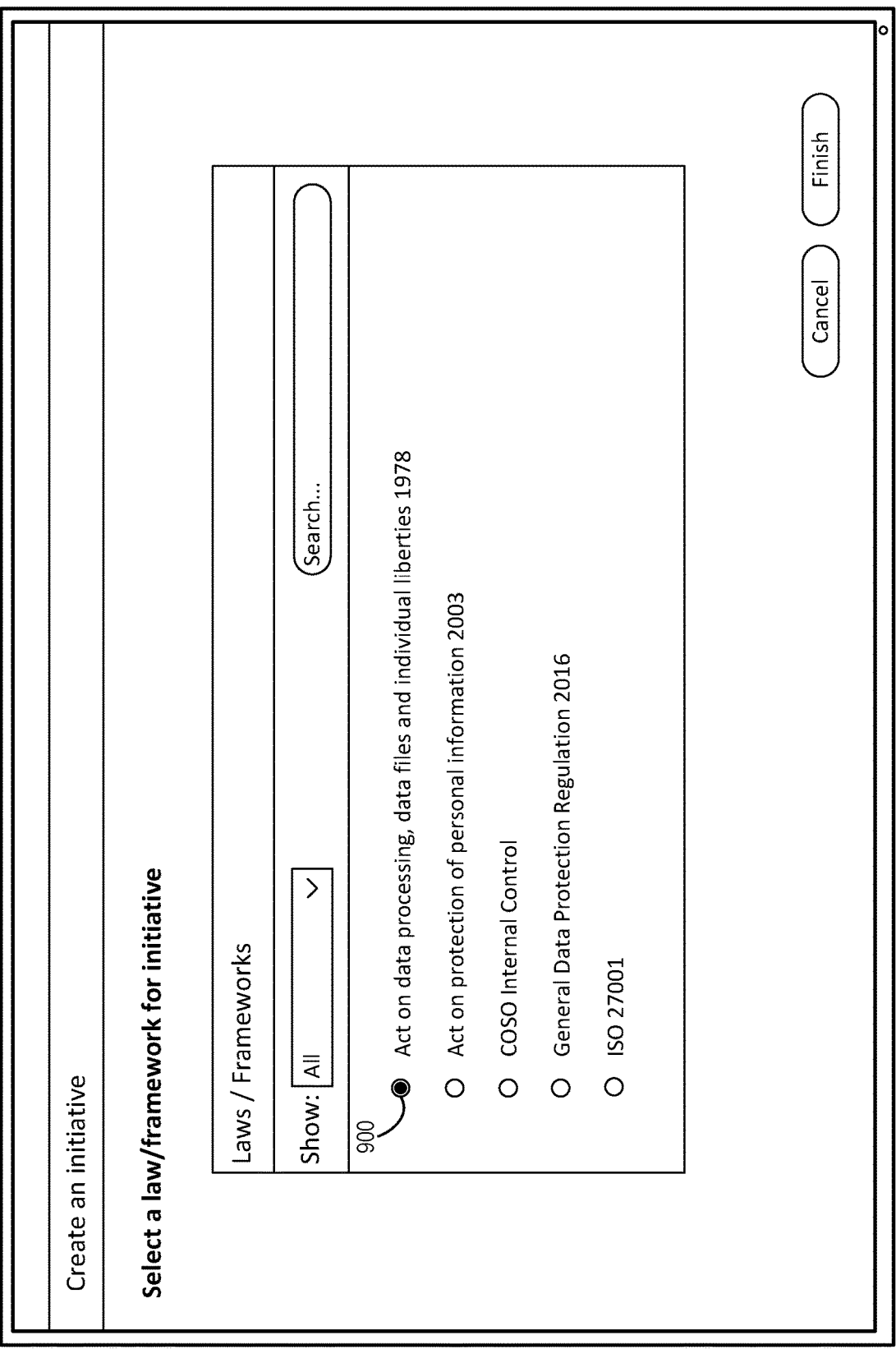
FIG. 9 illustrates an example of a graphical user interface for generating a compliance initiative for applicable system requirements frameworks in accordance with one or more embodiments.

FIG. 9 illustrates an example of a graphical user interface of a client application on a client device for selecting a system requirements framework for a compliance initiative. In particular, as illustrated, the compliance management computing system 102 provides, for display via the graphical user interface, one or more system requirements frameworks applicable to the entity (e.g., based on the entity's location/jurisdiction or other information provided during onboarding). The compliance management computing system 102 can determine a selected system requirements framework 900 for the compliance initiative. In connection with selecting a system requirements framework, the client device can display additional graphical user interfaces for selecting controls or data objects. Alternatively, the compliance management computing system 102 can automatically select the controls and/or data objects based on previously provided information (e.g., during onboarding or another initiative).

The compliance management computing system 102 links the selected system requirements framework 900 and applicable controls to the compliance initiative. In some embodiments, linking the data objects to the compliance initiative involves updating one or more suitable data objects within the compliance initiative to include identifiers of any selected system requirements frameworks 900 and/or applicable controls from each selected system requirements framework 900. For instance, control actions stored in an array of the compliance initiative can be updated to include respective identifiers of controls, along with an identifier of each control's requirements framework, as depicted in the example of FIG. 3B. In additional or alternative embodiments, linking the data objects to the compliance initiative involves updating a linking dataset with a set of link records, where each link record has the identifier of the compliance initiative and a respective identifier for any selected system requirements frameworks 900 and a respective identifier of an control from each selected system requirements framework 900.

Figure 10:
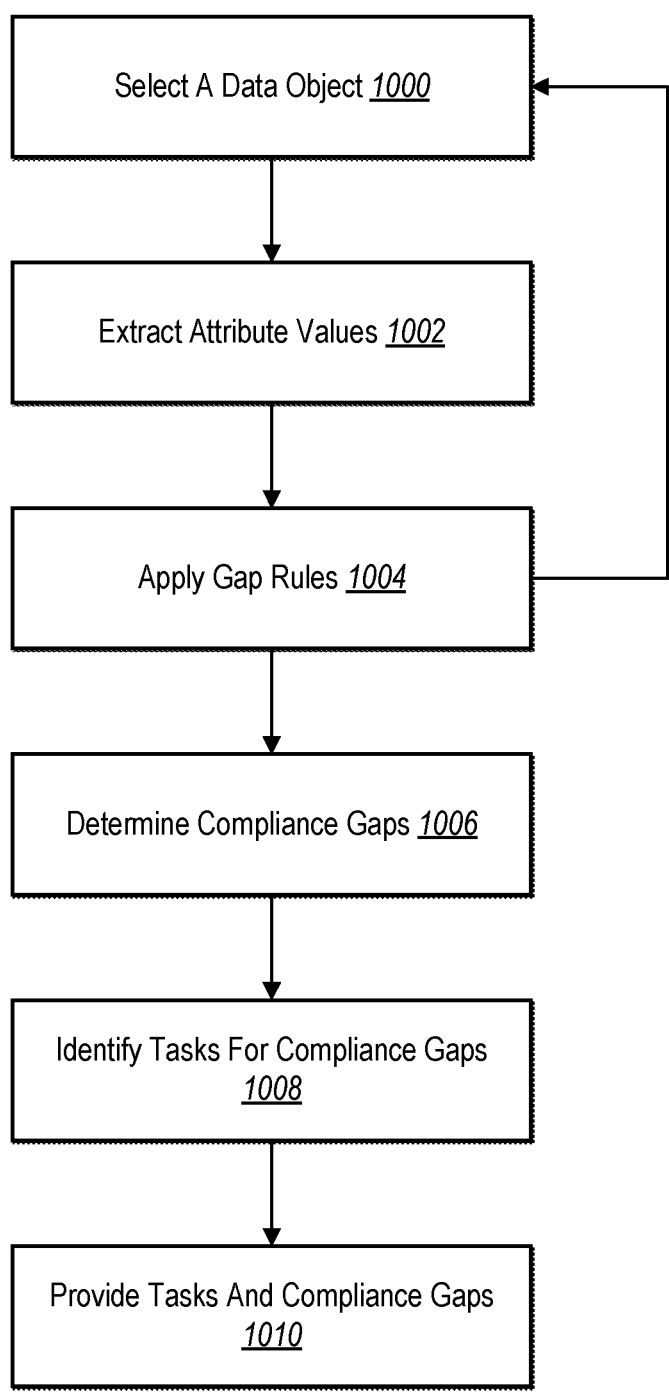
FIG. 10 illustrates a flowchart of a process for determining configuration gaps and corresponding tasks to a computing device in accordance with one or more embodiments.

After generating a compliance initiative, the compliance management computing system 102 further updates the compliance initiative by determining whether an entity is in compliance with one or more system requirements frameworks. FIG. 10 illustrates an overview of a process in which the compliance management computing system 102 updates a compliance initiative in connection with a system requirements framework and an entity. For example, the compliance management computing system 102 performs an act 1000 of selecting a data object to process associated with the compliance initiative. To illustrate, the compliance management computing system 102 selects a data object indicated by the compliance initiative, such as by using a process that iteratively processes data objects for the entity (e.g., according to an inventory of data objects). Accordingly, the compliance management computing system 102 can select a first data object indicated by the iterative process.

The compliance management computing system 102 also performs an act 1002 of extracting attribute values for the data object. Specifically, the compliance management computing system 102 can read attribute values from records stored in a digital data repository for the data object (e.g., according to an identifier of the data object). In some embodiments, extracting attribute values involves the examples described above with respect to the data extraction subsystem 322 used to perform at least some operations during the data extraction stage.

In one or more embodiments, the compliance management computing system 102 performs an act 1004 of applying gap rules using attribute values obtained in the act 1002. For instance, the compliance management computing system 102 utilizes the gap rules associated with the compliance initiative to determine whether the attribute values indicate compliance with the system requirements framework. To illustrate, the compliance management computing system 102 identifies one or more attributes associated with the data object, such as attributes indicated by gap rules corresponding to the compliance initiative, and reads each of the attribute values corresponding to the identified attributes. The compliance management computing system 102 applies the gap rules set by determining whether each attribute value corresponds to a set of relevant attribute values based on the gap rules set. In various example, an attribute value may be outside an acceptable threshold, may be included in a set of acceptable threshold values, or may specify the presence of a certain condition (e.g., a "location" attribute value indicating a location to which certain framework are applicable, an "industry" attribute value indicating a type of business to which certain framework are applicable, etc.). Accordingly, the compliance management computing system 102 determines the appropriate attribute values for the corresponding data asset, data processing operation, computing system, or other type of function or infrastructure.

According to one or more embodiments, the compliance management computing system 102 utilizes the iterative process to determine whether there are more data objects to be processed. In response to determining that there are more data objects to be processed, the compliance management computing system 102 selects another data object. The compliance management computing system 102 proceeds with identifying the attribute values of the new data object and applies the gap rules to the attribute values of the new data object.

As illustrated in FIG. 10, the compliance management computing system 102 performs an act 1006 of determining configuration gaps based on the attribute values and gap rules. In particular, the compliance management computing system 102 determines a configuration gap for a particular attribute value of a data object. To illustrate, the compliance management computing system 102 determines whether the attribute value corresponds to an attribute value indicated by a gap rule. In response to determining that the correspondence is absent (e.g., based on the comparison), the compliance management computing system 102 determines a configuration gap for the attribute value. Accordingly, the compliance management computing system 102 determines that the entity is not in compliance with at least a portion of the system requirements framework associated with the compliance initiative based on the configuration gap.

According to one or more embodiments, the compliance management computing system 102 assists in correcting the configuration gaps. Specifically, the compliance management computing system 102 performs an act 1008 of identifying tasks for the configuration gaps. For instance, the compliance management computing system 102 utilizes information associated with the entity to generate tasks for implementing one or more control actions associated with the configuration gaps. To illustrate, the compliance management computing system 102 can utilize information about the entity (e.g., from a digital data repository) to determine one or more individuals associated with specific data objects or control actions. The compliance management computing system 102 can assign the generated tasks to the appropriate individuals to implement the corresponding control actions during an execution stage of the compliance management process. In connection with generating the tasks, the compliance management computing system 102 also performs an act 1010 of providing the tasks and configuration gaps for display via a graphical user interface of a client device.

For example, a control for a particular system requirements framework (e.g., PCI DSS) is defined to restrict physical access to cardholder data, and the corresponding control action requires that an entity destroy media when the media is no longer needed for business or legal reasons. In response to determining that the entity has a configuration gap related to the control (e.g., the entity has data stored in a data asset that is not routinely purged), the compliance management computing system 102 generates two tasks for implementing the control action of destroying the data stored in the data asset when no longer needed for business or legal reasons. The compliance management computing system 102 determines that the first task is to establish a first process for recognizing when data stored in the data asset is no longer needed for business or legal reasons. The compliance management computing system 102 determines that the second task is to set up a second process for purging data stored in the data asset at the appropriate time.

In one or more embodiments, the compliance management computing system 102 prepopulates the tasks to implement the various control actions in a digital data repository for automatically generating/determining the tasks. In alternative embodiments, the compliance management computing system 102 also allows a user to manually define a task to perform for a control action (e.g., via user input to a client device). In one or more embodiments, the compliance management computing system 102 also prioritizes configuration gaps and/or corresponding tasks according to importance. As described in relation to FIG. 12 below, the compliance management computing system 102 can also provide additional information associated with configuration gaps and/or other analysis related to processed data objects.

Figure 11:
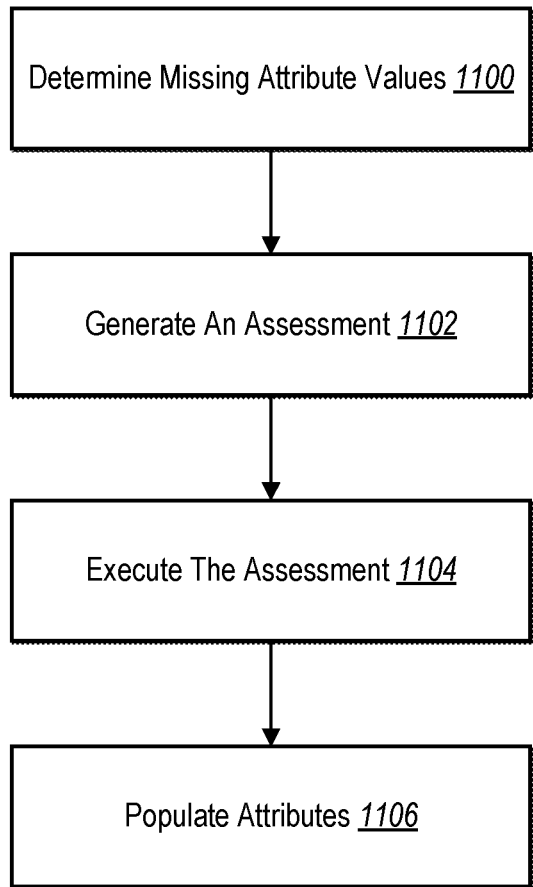
FIG. 11 illustrates a flowchart of a process for generating and executing an assessment to determine missing attribute values of data objects in accordance with one or more embodiments.

FIG. 11 illustrates an overview of a process in which the compliance management computing system 102 utilizes an assessment to obtain missing attribute values for data objects. In particular, as previously mentioned, the compliance management computing system 102 may determine that one or more attribute values for a data object are missing. Accordingly, the compliance management computing system 102 utilizes an assessment to obtain the missing attribute values for performing a complete review of an entity's compliance with a system requirements framework.

FIG. 11 illustrates that the compliance management computing system 102 performs an act 1100 of determining missing attribute values of data objects. For instance, in a data extraction stage, the compliance management computing system 102 can determine that specific attribute values must be present based on the gap rules. In response to determining that one or more attribute values (or a corresponding record) is empty/null for a particular data object.

FIG. 11 also illustrates that the compliance management computing system 102 performs an act 1102 of generating an assessment to obtain the missing attribute values(s) for one or more data objects. For example, the compliance management computing system 102 utilizes the assessment subsystem 324 of FIG. 3A to generate an assessment. As previously described, the assessment can include a computer-implemented questionnaire, a query of a database or computing device/system, or other communication to obtain the missing value(s) for one or more data objects.

The compliance management computing system 102 further performs an act 1104 of executing the assessment. Specifically, the compliance management computing system 102 sends a computer-implemented questionnaire (including one or more electronic survey questions) to the client devices of one or more users for response by the one or more users. For example, the compliance management computing system 102 generates and sends the questionnaire to the client devices of personnel associated with the data objects and/or the specific control actions corresponding to the missing attribute value(s).

In one or more embodiments, as mentioned, the compliance management computing system 102 dynamically adapts the questionnaire based on responses by a particular user. For instance, based on a first response to a first question, the compliance management computing system 102 can modify the questionnaire to skip a second question and provide a third question. The compliance management computing system 102 can receive a second response to the third question and determine the missing attribute based on the first response, the second response, or a combination of the first response and the second response.

For example, a questionnaire includes questions to determine a type of encryption that is currently being used in encrypting data stored on a data asset represented by a particular data object. The compliance management computing system 102 can provide the questionnaire with a first question to display on a graphical user interface to inquire whether the encryption process involves symmetric encryption or asymmetric encryption. Based on a user's response to the first question, the compliance management computing system 102 provides a second question asking whether a particular type of encryption is being used to encrypt the data stored on the data asset. For example, if the response indicates that symmetric encryption is being used, the compliance management computing system 102 provides a second question asking if the type of encryption being used is triple data encryption algorithm (Triple DES) encryption (a type of symmetric encryption). However, if the response to the first question indicates that asymmetric encryption is being used, the compliance management computing system 102 provides a question asking if the type of encryption being used is Rivet-Shamir-Adleman (RSA) encryption (a type of asymmetric encryption).

In one or more embodiments, the compliance management computing system 102 provides existing values for attributes for viewing with the questionnaire such that a respondent of the questionnaire can view the current values and/or modify the values. Furthermore, the compliance management computing system 102 can provide one or more tools to enable a user to monitor the progress of the questionnaires. The user can thus determine whether to intervene (e.g., with a reminder or follow-up communication) to ensure that the questionnaires are completed in a timely fashion.

Alternatively, the compliance management computing system 102 can provide all of the questions in the questionnaire to one or more users and/or a subset of the questions to one or more users. To illustrate, the compliance management computing system 102 can provide a first subset of questions to the client device of a first user related to a first control action and a second subset of questions to the client device of a second user related to a second control action. Additionally, the compliance management computing system 102 can provide all of the questions to a client device of a third user related to both the first control action and the second control action.

Although the description above describes an assessment including a questionnaire, the compliance management computing system 102 can also utilize other types of assessments to obtain missing attribute values. For example, the compliance management computing system 102 can submit a query to a database, website, or other computing system to obtain the missing attribute value(s). The compliance management computing system 102 can also scan metadata of files related to a particular data object within a digital data repository to obtain missing attribute values for the data object. Additionally, the compliance management computing system 102 can send an automated text message or an automated email to a client device of a user to obtain one or more missing attribute values. In some embodiments, the compliance management computing system 102 provides a link within an automated communication with which a user can interact (e.g., via an input to a client device) to cause the client device of the user to open a hyperlink to a webpage for providing the missing value (e.g., within an interface provided by the compliance management computing system 102).

In response to obtaining the responses for each of the missing attribute values, the compliance management computing system 102 can perform an act 1106 of populating attributes of one or more data objects. In particular, the compliance management computing system 102 can determine the storage locations for the missing attribute values and populate the corresponding storage locations with the corresponding attribute values received/determined via the assessment. To illustrate, in response to receiving a response to a question in a questionnaire indicating whether a particular data processing operation purges a database in a given interval (according to a requirement of a particular system requirements framework), the compliance management computing system 102 populates the corresponding attribute value for the corresponding database. In one or more embodiments, the compliance management computing system 102 also converts an obtained attribute value from a first format to a second format for storing in an attribute field of a digital data repository for the corresponding data object.

Figure 12:
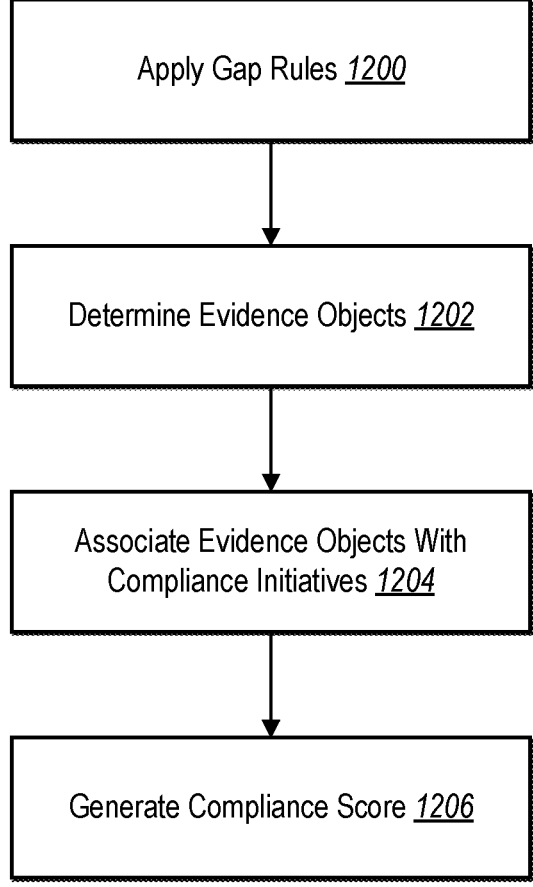
FIG. 12 illustrates a flowchart of a process for determining compliance scores and evidence objects according to gap rules of a system requirements framework in accordance with one or more embodiments.

In one or more embodiments, as previously mentioned, the compliance management computing system 102 collects evidence of controls already implemented for an entity relative to a given system requirements framework. FIG. 12 illustrates an overview of a process in which the compliance management computing system 102 utilizes gap rules to determine a portion of controls already installed. Additionally, FIG. 12 illustrates that the compliance management computing system 102 collects evidence of implemented controls associated with a compliance initiative.

As illustrated in FIG. 12, the compliance management computing system 102 performs an act 1200 of applying gap rules to a plurality of attribute values of a plurality of data objects. For example, as described above in relation to FIG. 10, the compliance management computing system 102 compares attribute values of the data objects to relevant attribute values indicated by the gap rules. In one or more embodiments, the compliance management computing system 102 determines one or more controls that the entity has not installed (e.g., indicating configuration gaps, as described above) and one or more controls that the entity has installed by applying the gap rules.

According to one or more embodiments, the compliance management computing system 102 performs an act 1202 of determining evidence objects for a compliance initiative. For instance, the compliance management computing system 102 uses evidence objects to track collection of evidence indicating that specific controls have been implemented with respect to the system requirements framework. In one or more embodiments, an evidence object includes a data object representing, or otherwise indicating, digital data for proving or verifying that a particular control has been installed/implemented. The compliance management computing system 102 can link or otherwise associate an evidence object with a compliance initiative if the evidence object has an evidence task class linked to one or more controls specified by control actions of the compliance initiative and, in some embodiments, if the evidence object also identifies an evidence collection date within an observation period of the compliance initiative.

In some embodiments, determining an evidence object includes instantiating or otherwise creating a new evidence object. For instance, if no evidence objects with a relevant evidence task class are available for linking to the compliance initiative (e.g., because none are present in the digital data repositories 108, none are available to an entity's tenant, or none are authorized for access by a user working with the compliance initiative), the compliance management computing system 102 can generate an instance of an evidence object having an evidence task class that is linked to at least one of the compliance initiative's identified controls. The compliance management computing system 102 stores the generated evidence objects for use (and reuse) in connection with one or more compliance initiatives (e.g., indicating one or more evidence tasks/evidence task classes as described above with respect to FIGS. 3A and 3B). In additional or alternative embodiments, determining an evidence object includes identifying an existing instance of an evidence object that is relevant to the compliance initiative, such as a "shared" evidence object described above with respect to FIGS. 3A and 3B that has an evidence task class linked to at least one of the compliance initiative's identified controls and a collection date included in (or relevant to) the compliance initiative's observation period.

The compliance management computing system 102 can further utilize evidence objects to track/monitor the collection of evidence of implementation of one or more controls. To illustrate, the compliance management computing system 102 determines, automatically and/or responsive to user input, whether one or more files are stored in a digital data repository that indicate installation of a control (e.g., a document such as a SOC 2 or ISO 27001 certificate, as previously mentioned). Furthermore, the compliance management computing system 102 can store information (e.g., as or with an evidence object) associated with previous initiatives indicating that a particular control has been installed.

In some embodiments, the compliance management computing system 102 can integrate with one or more computing systems (e.g., third-party computing systems associated with an entity). For instance, the compliance management computing system 102 can integrate with a data system (e.g., an external computing system) to obtain information that is stored by the data system and that is associated with monitoring control installation for an entity. In one example, the compliance management computing system 102 can insert a script or program at a computing device communicatively coupled to the data system, where script or program performs one or more monitoring operations associated with a function or infrastructure represented by a data object. If the data system is updated to include information indicating that a control is installed, the compliance management computing system 102 can obtain that information via communication with the script or program on the computing device. In another example, the compliance management computing system 102 can connect with the data system via a suitable software integration or an application programming interface ("API") associated with a particular computing system. The compliance management computing system 102 can query (e.g., responsive to a user input and/or according to a scheduled task) the data system to determine whether the data system has been updated to include information indicating that a control is installed. The compliance management computing system 102 can obtain that information via a response to the query. In these or other examples, the compliance management computing system 102 identifies an evidence object associated with the control and stores the information from the data system using the evidence object (e.g., by storing evidence data in a file for later use and updating the evidence object with a pointer or other reference to the file). Thus, the compliance management computing system 102 automatically collects evidence for one or more functions or infrastructure represented by one or more data objects via one or more evidence objects in connection with one or more compliance initiatives and/or one or more system requirements frameworks.

In one or more embodiments, the compliance management computing system 102 determines an evidence object for a particular control in connection with collecting data from one or more computing systems via one or more evidence tasks. The compliance management computing system 102 can also determine that a particular control requires a plurality of separate evidence objects representing a plurality of separate evidence tasks (e.g., 2 or 3) for making a determination that the control is installed. To illustrate, the control may include a plurality of related requirements with regard to a particular function or infrastructure, and each requirement is associated with a specific evidence object and/or evidence task indicated by the evidence object. Thus, the compliance management computing system 102 determines that the control is installed in response to determining all evidence objects for the control.

As an example, a particular evidence task involves determining an organization chart including a position of a privacy officer along with a name of the privacy officer stored in one or more files on one or more computing devices. A second evidence task can involve determining documented roles and responsibilities of the privacy officer stored in one or more files on one or more computing devices. A third evidence task can involve determining evidence demonstrating communication of roles and responsibilities to the privacy officer stored in one or more files or computing devices (e.g., via stored emails or records). In other examples, the compliance management computing system 102 collects evidence for each evidence task based on an encryption state of a portion of data and stores collected evidence in (or otherwise in connection with) one or more evidence objects. The compliance management computing system 102 can determine that one or more controls (e.g., associated with authorizing access to data centers or other secure areas) are installed in response to determining each of the evidence objects above.

Furthermore, in some embodiments, the compliance management computing system 102 reuses evidence objects determined for one or more controls. For example, as illustrated in FIG. 12, the compliance management computing system 102 performs an act 1204 of associating evidence objects with compliance initiatives that identify controls linked to the evidence objects. To illustrate, a first control may require determination/collection of a specific type of evidence, which is represented by an evidence task class in an evidence object, in order to determine whether the first control is installed. Additionally, a second control may also require the same type of evidence. Accordingly, the compliance management computing system 102 can thus provide a recommendation to reuse the collected evidence object for the second control identified in one or more compliance initiatives in response to determining that the evidence object is used for the first control in one or more compliance initiatives.

In one or more embodiments, as illustrated in FIG. 12, the compliance management computing system 102 performs an act 1206 of generating a compliance score for the entity. In particular, the compliance management computing system 102 determines a proportion/percentage of controls associated with the compliance initiative that have been installed (e.g., in connection with previous compliance initiatives). The compliance management computing system 102 can generate the compliance score (e.g., an initial compliance score) based on the percentage of controls that have been installed for the entity. In one or more additional embodiments, the compliance management computing system 102 generates the compliance score by weighting controls based on importance, difficulty of implementation, whether an evidence object associated with a control indicates an outdated collection date (e.g., a collection date showing a control was implemented but that is too far in the past to establish current implementation), or number of data objects that each control affects. Additionally, the compliance management computing system 102 can provide the compliance score for display at a client device of the entity to indicate the level with which the entity is in compliance with the system requirements framework associated with the compliance initiative.

Figure 13:
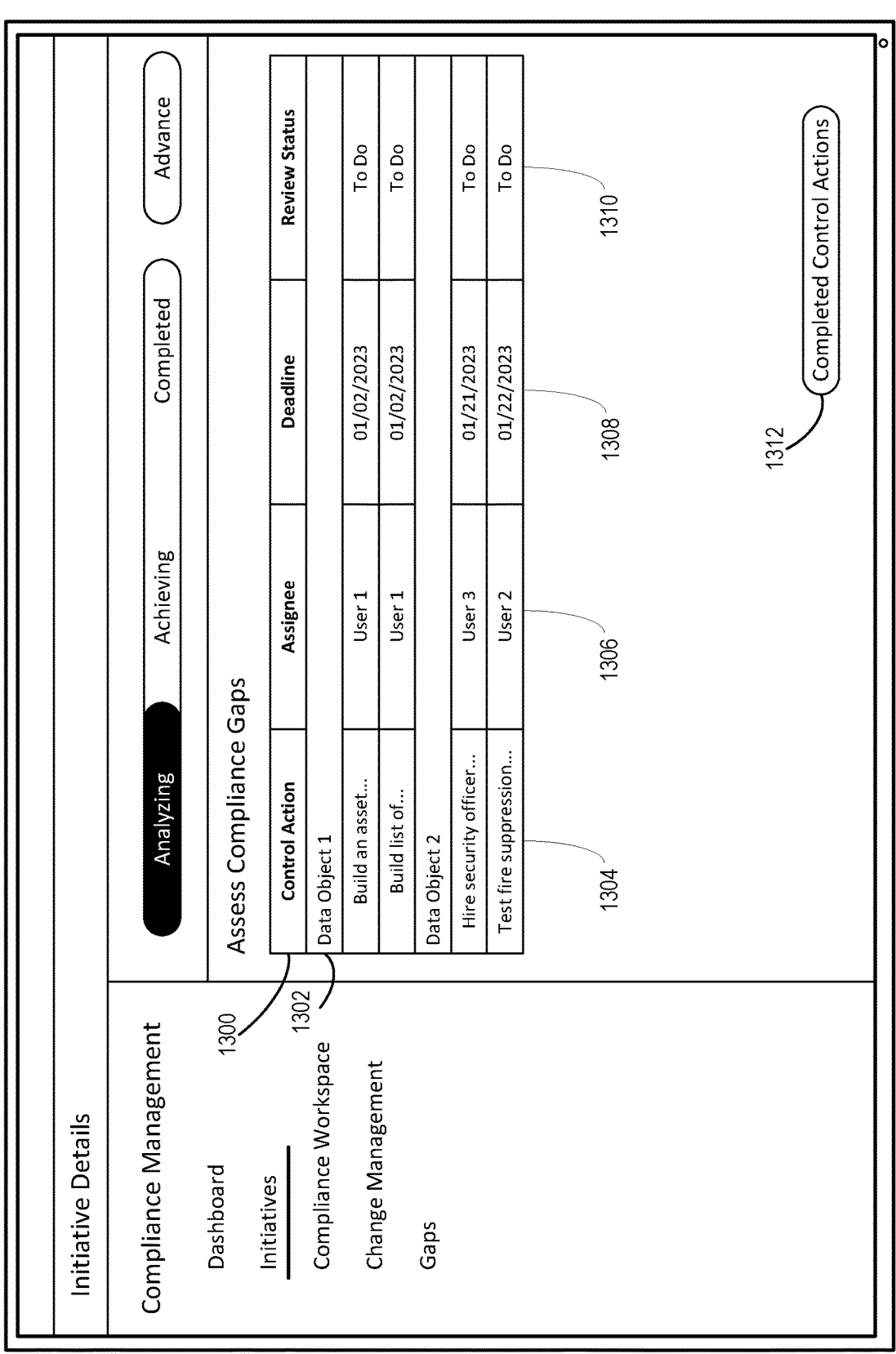
FIGS. 13-18 illustrate examples of graphical user interfaces for using a compliance initiative for managing configuration gaps in accordance with one or more embodiments.

FIGS. 13-20 provide example graphical user interfaces for executing a compliance management process that updates a compliance initiative when determining compliance of an entity with one or more system requirements frameworks. FIG. 13 illustrates a client application of a client device that displays tools for analyzing data objects to determine configuration gaps in a compliance initiative. Specifically, as shown, the client device displays an interface for assessing configuration gaps based on a plurality of functions or infrastructure represented by a plurality of data objects. To illustrate, the client device displays a table 1300 with a plurality of separate entries for data objects and sub-entries for corresponding control actions. For example, the client device displays a first entry 1302 related to a first function or infrastructure represented by a first data object associated with the entity.

As shown in FIG. 13, the client device also displays, within the table 1300, a plurality of columns related to different configuration gaps (and corresponding control actions). In particular, the client device displays a first column 1304 including a name of each control action (or task corresponding to each control action) to be completed to address a particular configuration gap. The client device also displays a second column 1306 including an assignee of one or more people to which each task is assigned. The client device displays a third column 1308 including a deadline (e.g., a date) for each task. Additionally, the client device displays a fourth column 1310 including a review status of each task, such as whether the task is completed, in progress, or yet to be started (i.e., "To Do"). FIG. 13 also illustrates that the client device displays a completed control actions element 1312, which upon selection, causes the client device to display completed control actions associated with the compliance initiative.

Figure 14:
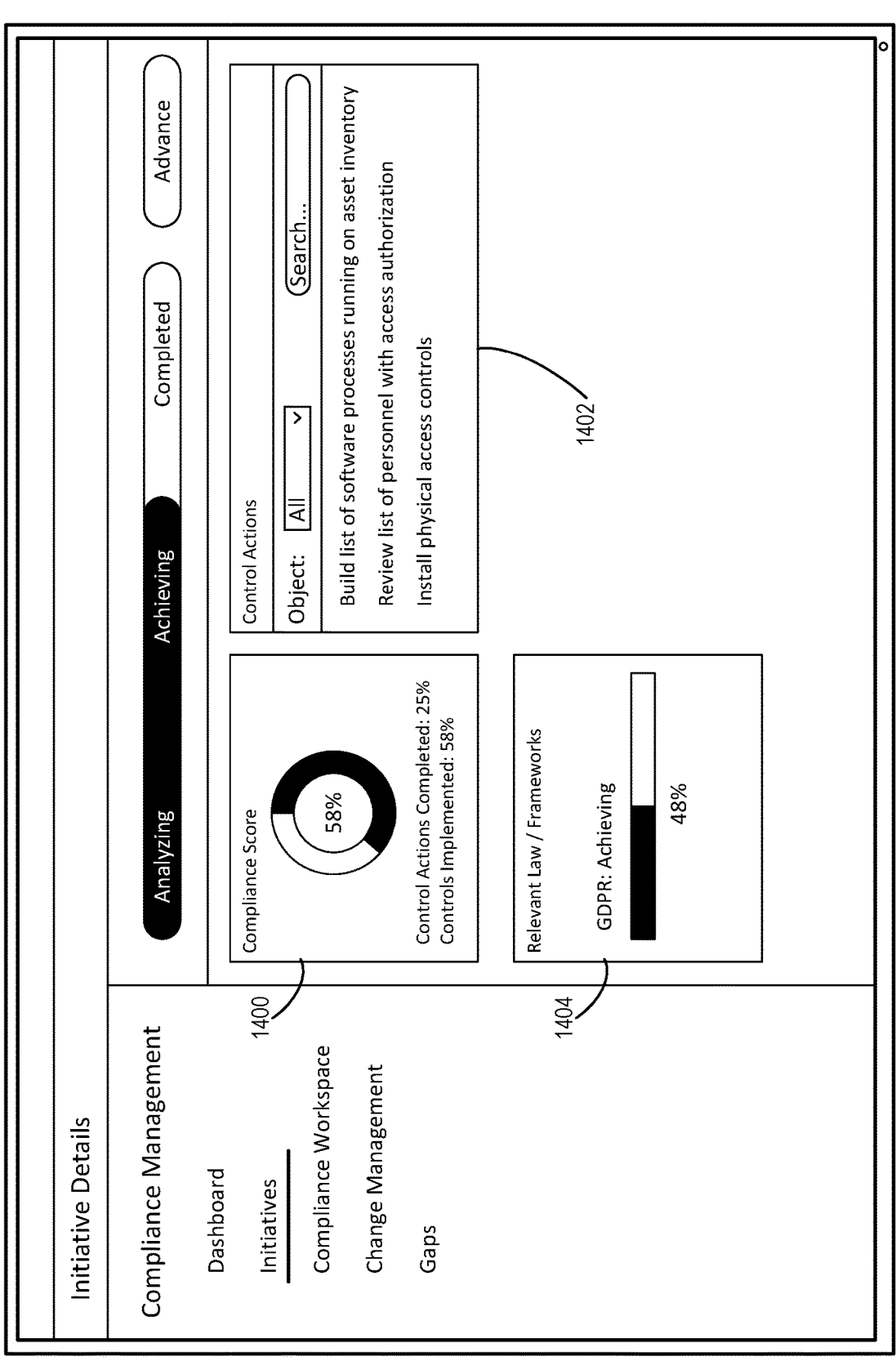

FIG. 14 illustrates a graphical user interface of a client application on a client device including a summary of details associated with a compliance initiative. For example, as shown in FIG. 14, the client device displays a compliance score element 1400 indicating a level of compliance of the entity according to the compliance initiative. Additionally, the compliance score element 1400 can include additional information such as the percentage of control actions completed (e.g., based on identified configuration gaps) and the percentage of controls implemented. Furthermore, the client device displays a list of control actions 1402 that need to be completed to address configuration gaps identified for the compliance initiative. Additionally, as shown, the client device includes a framework element 1404 including details associated with the framework, such as a completion percentage and/or a stage of a corresponding compliance initiative (e.g., "analyzing," "achieving," "completed"). In one or more embodiments, the client device also displays additional information associated with a compliance initiative, such as a name of the compliance initiative, an entity associated with the compliance initiative, an owner of the compliance initiative, a deadline, and a priority setting for the initiative.

As mentioned, the compliance management computing system 102 can generate a compliance score for an entity based on compliance with various controls of a particular compliance initiative. In one or more embodiments, the compliance management computing system 102 generates a compliance score by dividing the number of implemented controls by the number of controls corresponding to the compliance initiative. Additionally, the compliance management computing system 102 can determine the number of controls corresponding to the compliance initiative based on active controls (e.g., without controls that are "retired" or that the entity has elected not to perform). In additional embodiments, the compliance management computing system 102 also provides a percentage of evidence objects (discussed in more detail below) determined relative to the total number of evidence objects in a compliance initiative.

Figure 15:
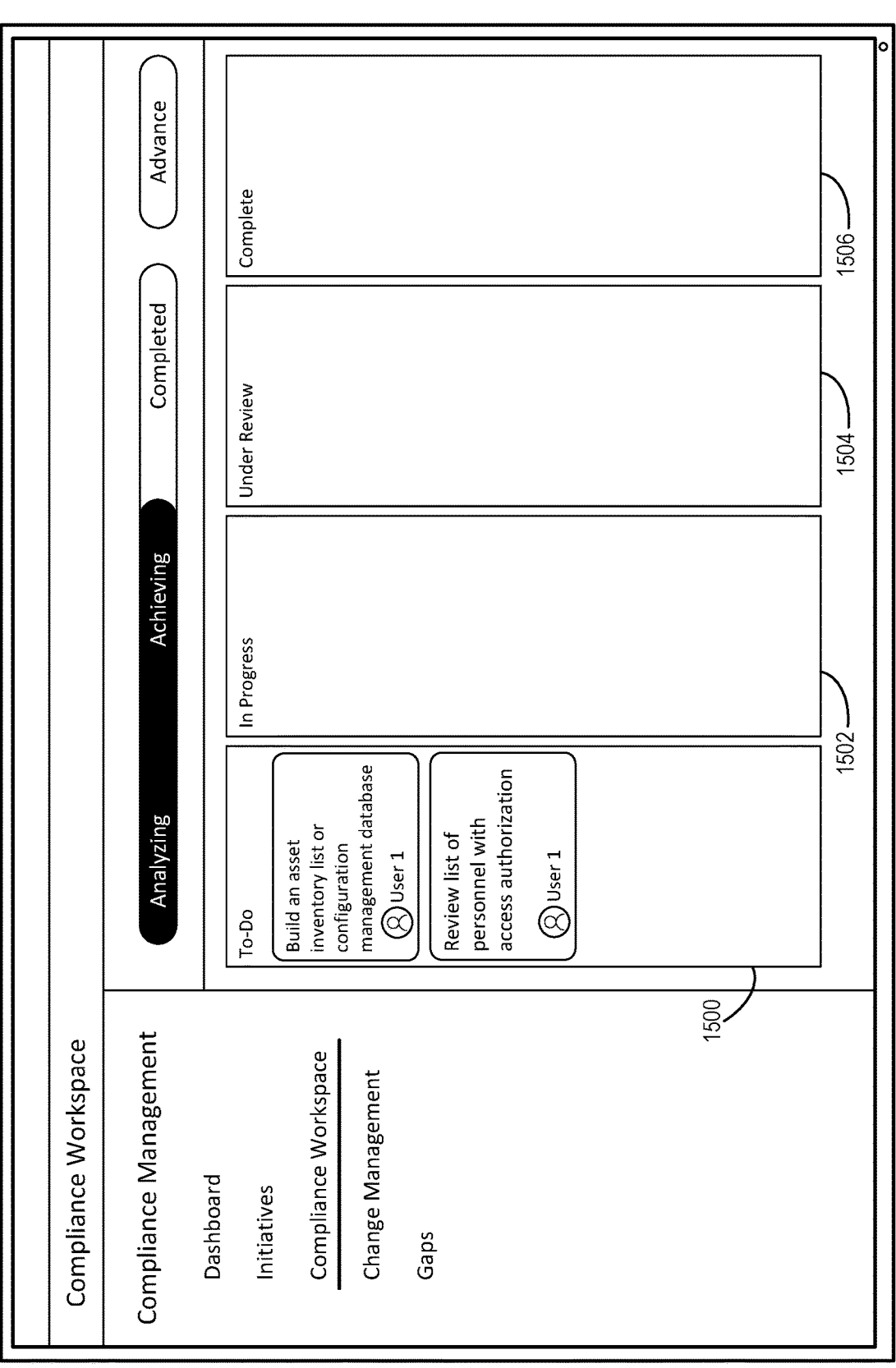

FIG. 15 illustrates an example graphical user interface of a client application on a client device for viewing progress of tasks in a compliance initiative. For example, FIG. 15 illustrates that the client device displays a plurality of columns associated with different statuses of tasks. To illustrate, the client device displays a first column 1500 corresponding to tasks that have not been started, a second column 1502 corresponding to tasks that are in progress, a third column 1504 corresponding to tasks that are under review (e.g., by another user not assigned to the task), and a fourth column 1506 corresponding to completed tasks. The client device can thus provide a user associated with a particular compliance initiative with an easy, user-friendly way to see the status of each task assigned to the user (or to a group including the user).

Figure 16:
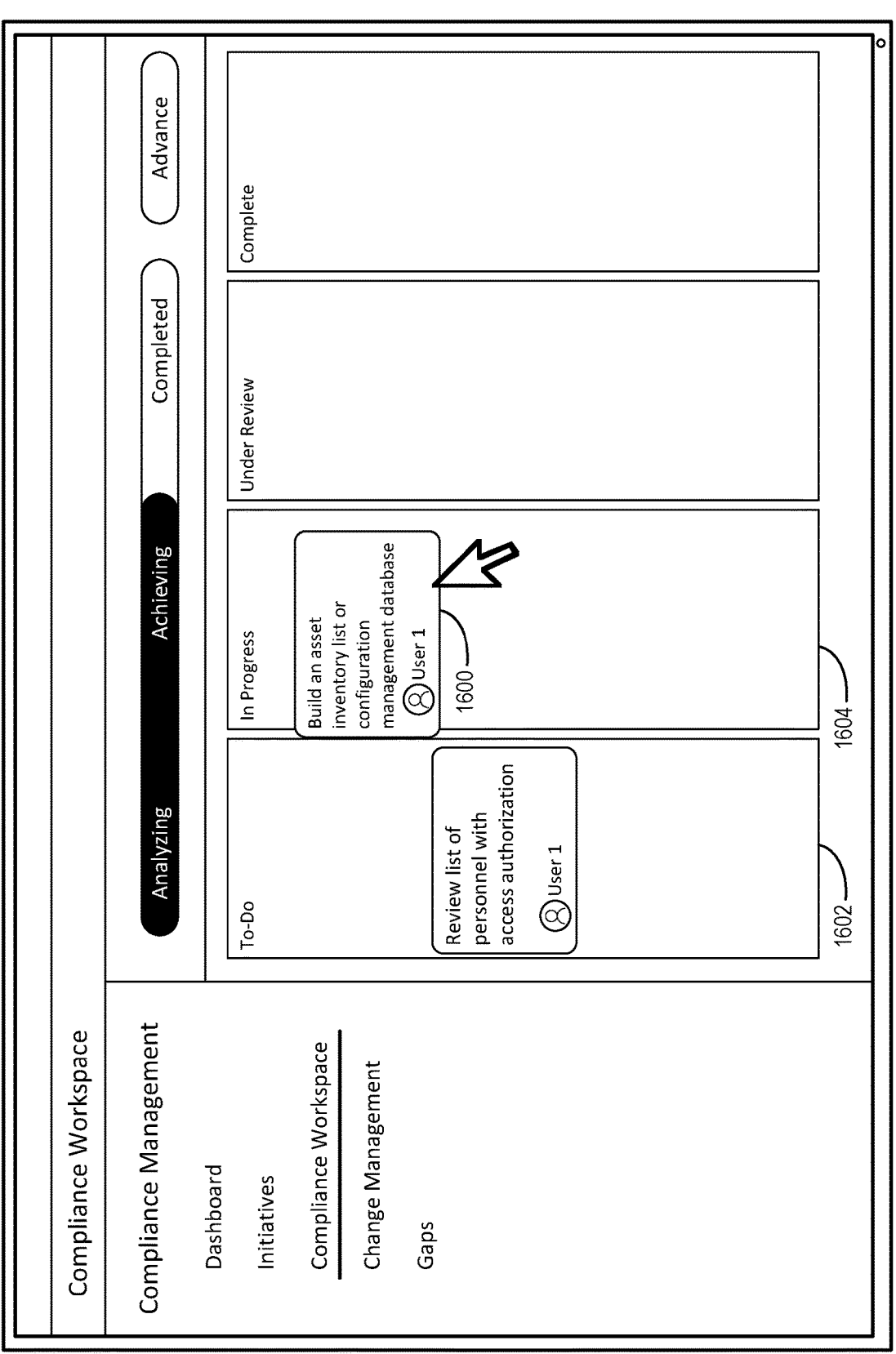

In one or more embodiments, the compliance management computing system 102 also provides tools for updating statuses of tasks. Specifically, as illustrated in FIG. 16, a client device provides tools for a user to move tasks from one column to another. For example, the client device detects a selection of a task element 1600 to move a first task from a first column 1602 corresponding to tasks that have not been started to a second column 1604 corresponding to tasks that are in progress. The client device can update the graphical user interface to display the task element 1600 in the second column 1604. Additionally, in some embodiments, the client device provides options for changing details associated with a task, such as by changing a deadline or uploading evidence supporting completion of the task.

In one or more embodiments, the compliance management computing system 102 also provides monitoring of tasks in connection with control actions for a compliance initiative. For example, the compliance management computing system 102 tracks progress of one or more tasks by monitoring changes to functions or infrastructure represented by data objects (e.g., to one or more data assets or one or more data processing operations) in connection with a system requirements framework. To illustrate, the compliance management computing system 102 can utilize an integrated script or program to determine that a data asset (e.g., a storage drive) or data program operation (e.g., one or more files or portions of an application) have changed. The compliance management computing system 102 can utilize such changes to determine that one or more controls have been installed in connection with one or more tasks.

In particular, the compliance management computing system 102 can monitor functions or infrastructure represented by data objects or other data sources for triggering events indicating a change to the functions or infrastructure and/or to a system requirements framework associated with a compliance initiative. For instance, the compliance management computing system 102 determines that a triggering event occurs in response to detecting data that indicates a change to a function or infrastructure or to a digital representation of a digital framework. Thus, controls installed at or in connection with a function or infrastructure (e.g., implementation of encryption at a database, movement of a data asset from one location to another) or changes to a system requirements framework (e.g., new requirements added or existing requirements changed/removed, new system requirements frameworks being applied to a function or infrastructure) indicate triggering events. In one or more embodiments, the compliance management computing system 102 monitors third-party computing systems or data sources to detect changes to system requirements frameworks (e.g., via public websites or government bulletins).

The compliance management computing system 102 can detect such triggering events via an automated monitoring application and update affected compliance initiatives. For example, in response to determining that a change in a function or infrastructure represented by a data object or a system requirements framework affects a compliance initiative, the compliance management computing system 102 can update the status of the compliance initiative to an analyzing stage. The compliance management computing system 102 can perform an updated iterative process to analyze data objects and determine whether the triggering events caused configuration gaps (e.g., via updated gap rules or modified attribute values). For instance, the analyzing stage triggered by detection of a triggering event can involve adding new control actions to a compliance initiative, determining whether any evidence objects are applicable to controls specified in the new control actions, and updating the control action to indicate a status of these controls based on the presence or absence of an applicable evidence object. In response to determining that the triggering events caused a configuration gap, the compliance management computing system 102 can generate new tasks and display the tasks and configuration gaps in connection with the compliance initiative. For instance, a new or modified control action could include a control, where no applicable evidence object indicates that evidence of the control's implementation has been collected (e.g., any evidence objects with an evidence task class linked to the control have collection dates outside the observation period of the compliance initiative). In this instance, the compliance management computing system 102 can generate a new task indicating that documentation or evidence required by an evidence object associated with the control must be uploaded to a digital data repository 304.

In one or more embodiments, the compliance management computing system 102 also provides tools for implementing control actions according to generated tasks. For example, the client device can display options to access data objects and view, delete, generate, or otherwise modify data associated with the data objects. To illustrate, the compliance management computing system 102 can provide tools for applying modifications to data assets (e.g., by encrypting data at a database or installing a physical access device at a data center) or to data processing operations (e.g., by running certain programs with administrator privileges and password protection). Thus, to address configuration gaps, one or more users can interact with one or more client devices, physical access controls, or other data assets or data processing operations to install one or more controls.

Additionally, the compliance management computing system 102 can utilize information about modifications to data assets and/or data processing operations (or other functions or infrastructure represented by data objects) to update a compliance initiative. For example, in response to a modification to a particular data asset or data processing operation, the compliance management computing system 102 can modify a status of a particular control from "in progress" to "completed." Thus, the entity can improve compliance with the applicable system requirements framework by modifying data assets or data processing operations to bring the corresponding controls into compliance according to the compliance initiative.

Figure 17:
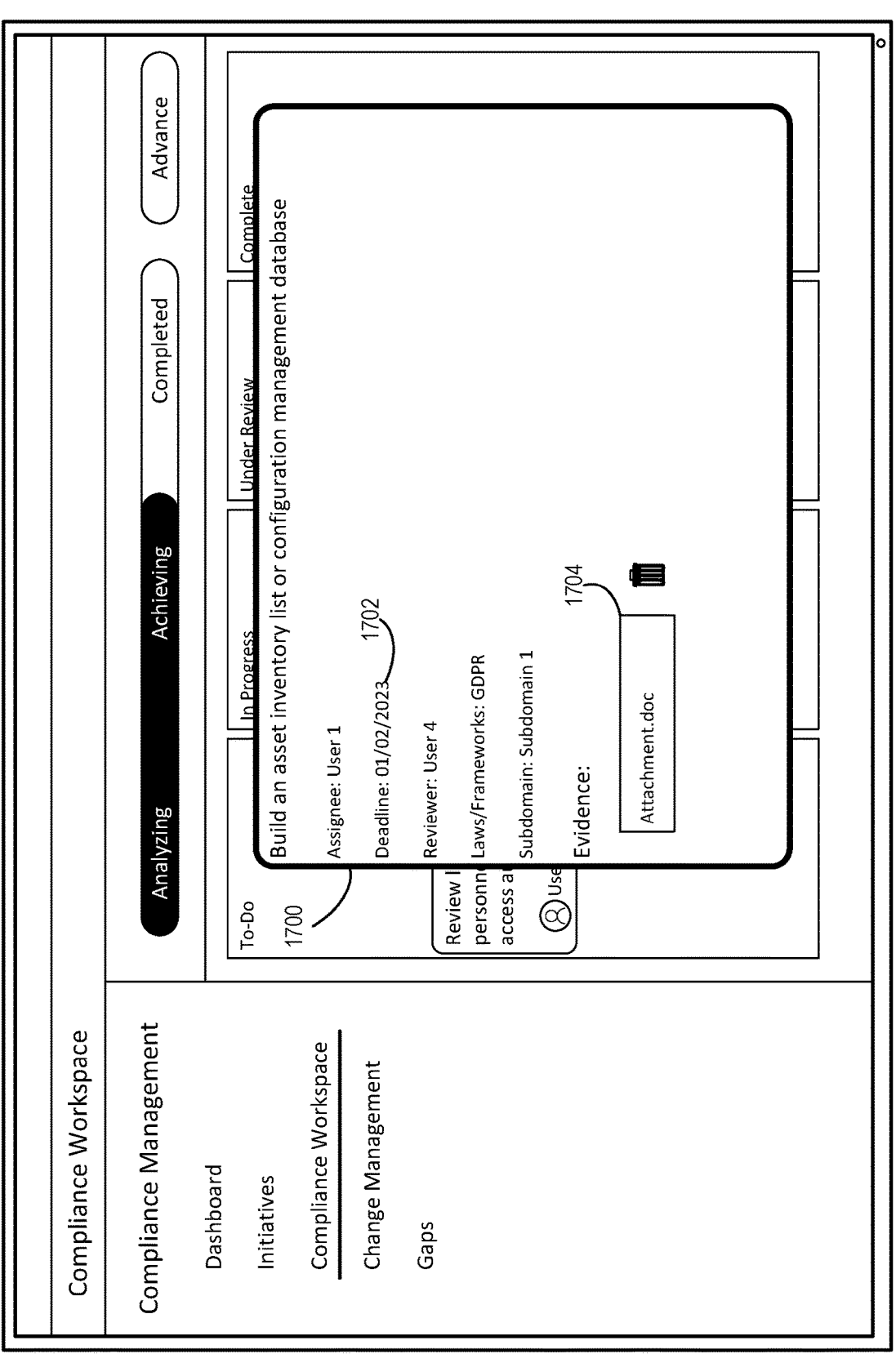

Furthermore, in some embodiments, the compliance management computing system 102 provides tools for viewing details associated with a task. FIG. 17 illustrates an example of a graphical user interface for displaying details of a selected task in connection with a compliance initiative. For example, in response to a selection to view additional details of a task, the client device displays an overlay 1700 with the additional details. To illustrate, the client device displays a deadline 1702 for the task, one or more assigned users/reviewers, a corresponding system requirements framework, and an uploaded file 1704 indicating evidence corresponding to the task. The client device can also provide tools for modifying details associated with the task, such as by changing the deadline 1702, modifying/deleting/adding uploaded files, or changing a status of the task.

Figure 18:
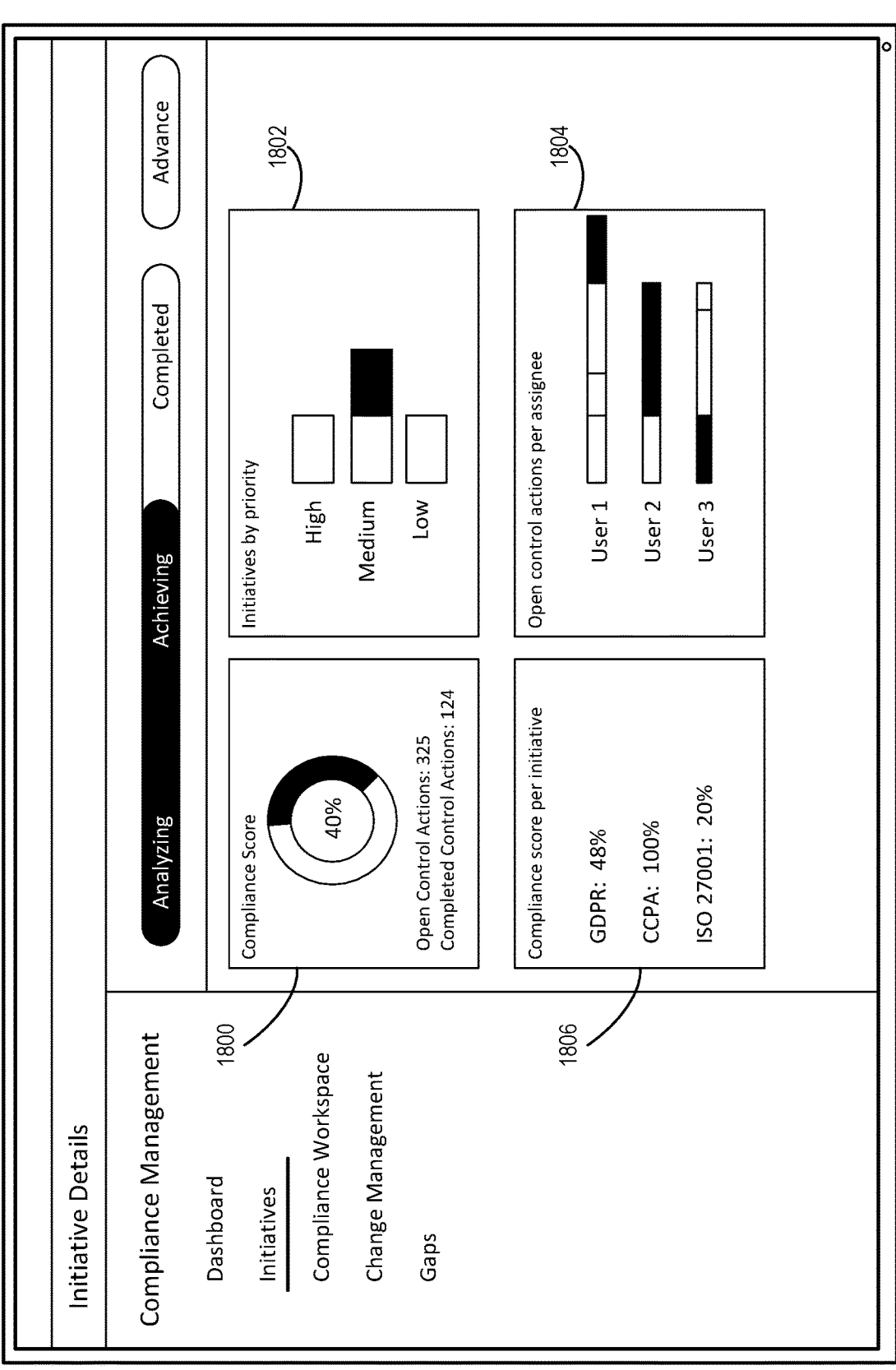

FIG. 18 illustrates an example graphical user interface for displaying a summary of compliance initiatives for an entity. Specifically, a client device displays a dashboard including information associated with all compliance initiatives for an entity. For example, the client device can display an overall compliance score element 1800 with an overall compliance score based on all compliance initiatives for the entity. Additionally, the client device can display a priority element 1802 including a priority of compliance initiatives (e.g., based on priority scores) of the entity. The client device can also display a control action element 1804 indicating a breakdown of control actions assigned to different users (and corresponding statuses). Furthermore, the client device can display an individual compliance score element 1806 including a plurality of individual compliance scores of various compliance initiatives associated with the entity.

Figure 20:
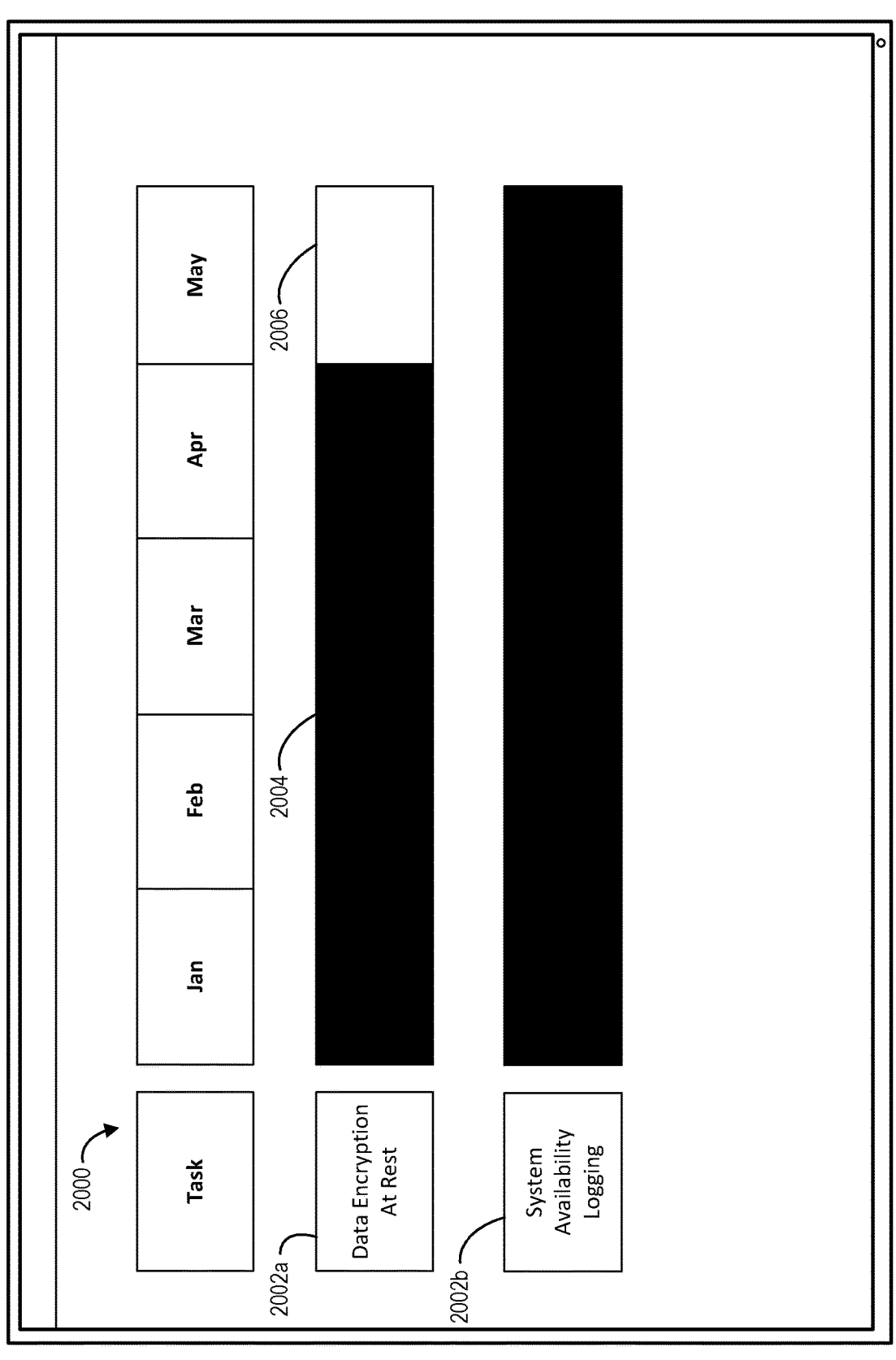

As mentioned, in one or more embodiments, the compliance management computing system 102 provides evidence collection for compliance initiatives of an entity. The compliance management computing system 102 can utilize the evidence to more efficiently determine compliance of the entity with respect to various functions or infrastructure and system requirements frameworks. Additionally, the compliance management computing system 102 can utilize evidence objects associated with the evidence to track the progress of the entity's compliance relative to one or more compliance initiatives. FIGS. 19-20 illustrate examples of graphical user interfaces for providing various details associated with evidence objects in connection with using compliance initiatives.

FIG. 19 illustrates an example graphical user interface for displaying a plurality of evidence tasks represented by one or more evidence objects associated with collecting evidence for one or more controls and corresponding attributes of the evidence objects. For example, FIG. 19 illustrates that the client device shows a first column 1900 including an identifier for each evidence object representing an evidence task indicating the type of evidence collected in connection with one or more controls. To illustrate, a first identifier 1900a corresponds to an evidence object indicating a first evidence task to collect evidence corresponding to data encryption at rest for a function or infrastructure represented by a data object. Additionally, a second identifier 1900b corresponds to a second evidence task corresponding to firewall configuration settings of a function or infrastructure represented by a data object. Accordingly, as the compliance management computing system 102 collects evidence in connection with the indicated evidence tasks, the compliance management computing system 102 can provide the information associated with the evidence determined based on the corresponding evidence objects for display via the client device. The compliance management computing system 102 can also store the collected evidence in connection with one or more evidence objects corresponding to the evidence tasks (e.g., by storing the collected evidence in the evidence object or otherwise with the evidence object).

Additionally, as shown in FIG. 19, the client device displays a second column 1902 including information for system requirements frameworks associated with each evidence task represented by a particular evidence object (e.g., indicating specific controls or system requirements frameworks for which the evidence task is applicable). The client device also displays a third column 1904 indicating a timeframe for collecting the evidence indicated by the corresponding evidence objects (e.g., yearly, monthly, on a specific date/time). The client device further displays a fourth column 1906 indicating a most recent collection/verification time for each evidence object in accordance with a corresponding control/control action. Furthermore, the client device displays a fifth column 1908 indicating an overall status of each evidence object (e.g., complete, incomplete, in progress).

According to one or more embodiments, the compliance management computing system 102 determines evidence objects as part of an automated integration application (e.g., a program or script). For example, the compliance management computing system 102 can run the application on (or in) predetermined portions of a function or infrastructure in a computing system (e.g., in a specific portion of a data asset) to verify one or more details associated with the function or infrastructure. To illustrate, the compliance management computing system 102 runs the application on data-at-rest in a computing system/infrastructure system to verify that data is encrypted. The compliance management computing system 102 can detect the encryption state of the data/databases in a public cloud environment.

In one or more embodiments, the compliance management computing system 102 also provides tools to schedule collection of evidence objects in connection with functions or infrastructure of an entity. For example, the compliance management computing system 102 can include an integration, such as a script/program for interfacing with an API of a digital data repository or third-party computing system to determine evidence objects according to one or more scheduled intervals/timeframes. To illustrate, the compliance management computing system 102 utilizes a scheduled evidence task timeframe to determine evidence objects for one or more data objects by accessing the digital data repository and/or third-party computing system at an appropriate time. The compliance management computing system 102 can thus automate evidence object determination. Alternatively, the compliance management computing system 102 collects evidence associated with one or more evidence objects on-demand (e.g., in response to a request by a client device).

FIG. 20 illustrates an example graphical user interface for displaying an evidence collection calendar 2000 including scheduling information associated with evidence objects. In particular, the client device displays progress of an entity in achieving compliance with a particular system requirements framework in the evidence collection calendar 2000 according to various evidence tasks represented by various evidence objects. For example, the client device displays information for a first evidence object 2002a and a second evidence object 2002b associated with various functions or infrastructure represented by various data objects.

In one or more embodiments, the client device displays whether the compliance management computing system 102 has collected evidence for each evidence object according to a set of time intervals (e.g., months). Accordingly, in response to collecting evidence according to an evidence object for a first time period, the compliance management computing system 102 can store an indication that the evidence task represented by the evidence object for the first time period is complete. The client device of FIG. 20 displays the indication that the evidence task represented by the evidence object for the first time period is complete in a first portion 2004 of the evidence collection calendar 2000.

Additionally, in response to determining that the compliance management computing system 102 has not completed the evidence task represented by the evidence object for a second time period, the compliance management computing system 102 can store an indication that the evidence task represented by the evidence object for the second time period is not complete. To illustrate, the client device displays the indication that the evidence task represented by the evidence object for the second time period is not complete in a second portion 2006 of the evidence collection calendar 2000. The client device can also display additional indicators associated with each evidence task represented by one or more evidence objects and/or time period, such as indicators of non-compliant evidence objects or evidence objects with upcoming deadlines.

In one or more embodiments, as mentioned, the compliance management computing system 102 links evidence objects across controls and/or system requirements frameworks. Accordingly, the compliance management computing system 102 can determine an evidence object for a first control or framework and update additional controls or frameworks based on determining the evidence object for the first control. Furthermore, the compliance management computing system 102 can update the evidence collection calendar 2000 based on the corresponding links between controls/frameworks.

Figure 21:
FIG. 21 illustrates an example flowchart of a process for detecting and managing configuration gaps in connection with a system requirements framework in accordance with one or more embodiments.
Figure 21:
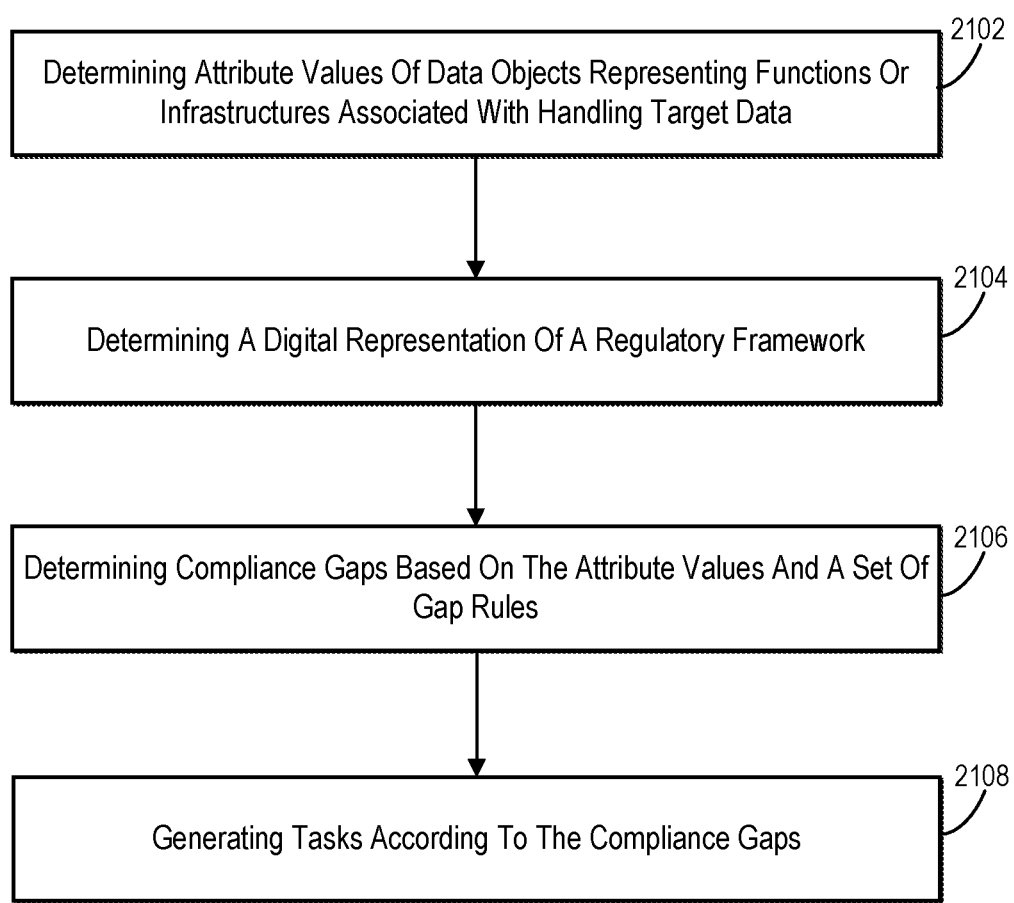

Turning now to FIG. 21, this figure shows a flowchart of a process 2100 of detecting and managing configuration gaps in connection with a system requirements framework. While FIG. 21 illustrates acts according to one embodiment, alternative embodiments may omit, add to, reorder, and/or modify any of the acts shown in FIG. 21. The acts of FIG. 21 can be performed as part of a method. Alternatively, a non-transitory computer readable medium can comprise instructions, that when executed by one or more processors, cause a computing device to perform the acts of FIG. 21. In still further embodiments, a system can perform the acts of FIG. 21.

As shown, the process 2100 includes an act 2102 of determining attribute values of data objects representing functions of infrastructure associated with handling target data. For example, act 2102 involves determining, by accessing a digital data repository, attribute values of a plurality of data objects associated with handling target data for an entity.

Act 2102 can involve integrating a data extraction software application with the digital data repository and a third-party system via an application programming interface associated with the one or more data assets or the one or more data processing operations. Act 2102 can involve extracting, utilizing the data extraction software application, the attribute values of the plurality of data objects in response to a selected option to initiate a review of the plurality of controls of the system requirements framework.

Act 2102 can involve extracting, utilizing a software application integrated with the digital data repository and a third-party computing system, the attribute values of the plurality of data objects in response to a selected option to initiate a review of the plurality of controls of the system requirements framework. For example, act 2102 can involve detecting, by a data extraction software application integrated with the digital data repository, a missing attribute value for a data object of the plurality of data objects. Act 2102 can involve generating, by an assessment software application in response to detecting the missing attribute value, an assessment comprising a computer-implemented questionnaire including one or more electronic questions associated with the missing attribute value of the data object. Act 2102 can involve executing the assessment by providing the assessment for display at a client device, and determining the missing attribute value for the data object based on a response to the assessment from the client device.

Act 2102 can involve detecting a missing attribute value for a data object of the plurality of data objects. Act 2102 can involve generating, in response to detecting the missing attribute value, an assessment comprising a computer-implemented questionnaire including one or more electronic questions associated with the missing attribute value of the data object. Act 2102 can also involve executing the assessment by providing the assessment for display at one or more client devices, and determining the missing attribute value for the data object based on a response to the assessment from the one or more client devices.

Act 2102 can involve executing the assessment by determining a first response to a first question of the one or more electronic questions provided to the one or more client devices. Act 2102 can involve skipping, based on the first response, a second question of the one or more electronic questions. Act 2102 can involve providing, based on the first response, a third question of the one or more electronic questions to the one or more client devices, and determining a second response to the third question. Act 2102 can further involve determining the missing attribute value of the data object comprises determining the missing attribute value based on the first response or the second response.

The process 2100 also includes an act 2104 of determining a digital representation of a system requirements framework. For example, act 2104 involves determining, from the digital data repository, a digital representation of a system requirements framework comprising a plurality of controls associated with handling specific data types. Act 2104 can involve determining one or more files including data indicating the plurality of controls associated with handling the specific data types.

The process 2100 further includes an act 2106 of determining configuration gaps based on the attribute values and a gap rules set. For example, act 2106 involves determining, based on the attribute values of the plurality of data objects and a gap rules set associated with the system requirements framework, a plurality of configuration gaps representing a plurality of control actions for installing controls in connection with one or more data assets or one or more data processing operations.

Act 2106 can involve determining a gap rule of the gap rules set based on one or more control actions of the plurality of control actions for installing one or more controls in connection with the one or more data assets or the one or more data processing operations. For example, act 2106 can involve determining a gap rule indicating an acceptable or relevant attribute value for a data object of the plurality of data objects. Act 2106 can also involve determining a configuration gap by applying the gap rule to the attribute values of the plurality of data objects to determine whether the attribute values comply with the system requirements framework. For example, act 2106 can involve determining a configuration gap by comparing one or more attribute values of the plurality of data objects to the acceptable or relevant attribute value of the gap rule.

Act 2106 can involve determining a plurality of acceptable or relevant attribute values based on the gap rules set. Act 2106 can also involve determining the plurality of configuration gaps by comparing the attribute values of the plurality of data objects to the plurality of acceptable or relevant attribute values.

Act 2106 can involve performing a plurality of iterations to process the plurality of data objects in connection with the system requirements framework. For example, act 2106 can involve performing an iteration of the plurality of iterations by determining a set of attribute values of a data object of the plurality of data objects. An iteration of the plurality of iterations can also involve determining a configuration gap in response to determining that the data object does not comply with the system requirements framework based on the set of attribute values of the data object and the gap rules set. More specifically, act 2106 can determine that a data asset or data processing operation represented by the data object does not comply with the system requirements framework in response to determining that an attribute of the data asset or an attribute of the data processing operation does not comply with the system requirements framework.

In one or more embodiments, act 2106 involves perform a plurality of iterations to process a plurality of data objects representing functions or infrastructure associated with handling target data for an entity by determining attribute values of the plurality of data objects. Additionally, act 2106 can involve performing the plurality of iterations by determining, from the digital data repository, a digital representation of a system requirements framework comprising a plurality of controls associated with handling specific data types. Act 2106 can further involve performing the plurality of iterations by determining, based on the attribute values of the plurality of data objects and a gap rules set associated with the system requirements framework, a plurality of configuration gaps representing a plurality of control actions for installing controls in connection with one or more data assets or one or more data processing operations.

Additionally, the process 2100 includes an act 2108 of generating tasks according to the configuration gaps. For example, act 2108 involves generating, for display via a graphical user interface of a computing device associated with the entity, one or more tasks for applying one or more modifications to the one or more data assets or the one or more data processing operations according to the plurality of configuration gaps. Act 2108 can involve determining one or more tasks associated with correcting the plurality of configuration gaps. Act 2108 can also involve providing the one or more tasks for display via a graphical user interface of a computing device associated with the entity.

The process 2100 can also include determining that a subset of the attribute values of the plurality of data objects correspond to one or more evidence objects indicating that at least a portion of a control of the plurality of controls is installed in connection with the one or more data assets or the one or more data processing operations. The process 2100 can include determining, based on the one or more evidence objects, that the control is installed in connection with the one or more data assets or the one or more data processing operations.

The process 2100 can include detecting, based on a subset of the attribute values of the plurality of data objects, a plurality of evidence objects corresponding to a control of the plurality of controls. The process 2100 can also include determining, based on the plurality of evidence objects, that the control is installed in connection with the one or more data assets or the one or more data processing operations.

Additionally, the process 2100 can include determining that a particular evidence object of the one or more evidence object corresponds to an additional control of the plurality of controls. The process 2100 can include determining, based on the particular evidence object, that the additional control is installed in connection with the one or more data assets or the one or more data processing operations.

The process 2100 can also include determining that a control of the plurality of controls is installed in connection with the one or more data assets or the one or more data processing operations in response to determining that a subset of the attribute values of the plurality of data objects correspond to one or more evidence objects associated with the control.

The process 2100 can also include generating, in response to a selected option to initiate the review of the plurality of controls of the system requirements framework, an initial compliance score based on a percentage of the plurality of controls installed in connection with the one or more data assets or the one or more data processing operations.

The process 2100 can include generating, based on the gap rules set associated with the system requirements framework, an initial compliance score based on a percentage of the plurality of controls installed in connection with the one or more data assets or the one or more data processing operations. The process 2100 can also include providing the initial compliance score with the one or more tasks for display via the graphical user interface of the computing device associated with the entity.

The process 2100 can also include detecting a triggering event comprising a change to the digital representation of the system requirements framework or a change to an attribute value of a data object of the plurality of data objects. The process 2100 can include determining, in response to the triggering event, whether the change to the digital representation of the system requirements framework or the change to the attribute value of the data object results in one or more additional configuration gaps. Accordingly, the process 2100 can include determining a configuration gap in response to the triggering event.

The process 2100 can include tracking progress of the one or more tasks by monitoring changes to the one or more data assets or the one or more data processing operations in connection with the system requirements framework.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 22:
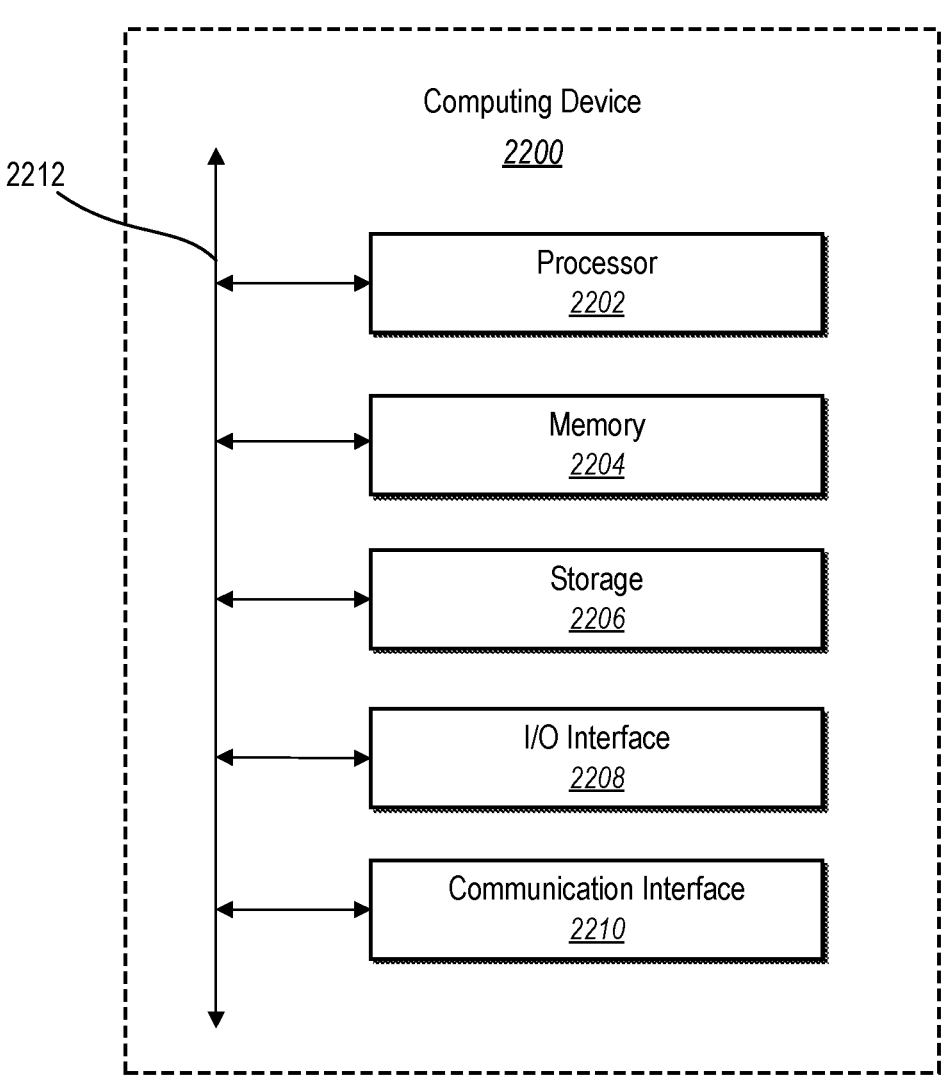
FIG. 22 illustrates an example of a computing device in accordance with one or more embodiments.

FIG. 22 illustrates a block diagram of exemplary computing device 2200 that may be configured to perform one or more of the processes described above. One will appreciate that one or more computing devices such as the computing device 2200 may implement the system(s) of FIG. 1. As shown by FIG. 22, the computing device 2200 can comprise a processor 2202, a memory 2204, a storage device 2206, an I/O interface 2208, and a communication interface 2210, which may be communicatively coupled by way of a communication infrastructure 2212. In certain embodiments, the computing device 2200 can include fewer or more components than those shown in FIG. 22. Components of the computing device 2200 shown in FIG. 22 will now be described in additional detail.

In one or more embodiments, the processor 2202 includes hardware for executing instructions, such as those making up a computer program. As an example, and not by way of limitation, to execute instructions for dynamically modifying workflows, the processor 2202 may retrieve (or fetch) the instructions from an internal register, an internal cache, the memory 2204, or the storage device 2206 and decode and execute them. The memory 2204 may be a volatile or non-volatile memory used for storing data, metadata, and programs for execution by the processor(s). The storage device 2206 includes storage, such as a hard disk, flash disk drive, or other digital storage device, for storing data or instructions for performing the methods described herein.

The I/O interface 2208 allows a user to provide input to, receive output from, and otherwise transfer data to and receive data from computing device 2200. The I/O interface 2208 may include a mouse, a keypad or a keyboard, a touch screen, a camera, an optical scanner, network interface, modem, other known I/O devices or a combination of such I/O interfaces. The I/O interface 2208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 2208 is configured to provide graphical data to a display for presentation to a user. The graphical data may be representative of one or more graphical user interfaces and/or any other graphical content as may serve a particular implementation.

The communication interface 2210 can include hardware, software, or both. In any event, the communication interface 2210 can provide one or more interfaces for communication (such as, for example, packet-based communication) between the computing device 2200 and one or more other computing devices or networks. As an example, and not by way of limitation, the communication interface 2210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 2210 may facilitate communications with various types of wired or wireless networks. The communication interface 2210 may also facilitate communications using various communication protocols. The communication infrastructure 2212 may also include hardware, software, or both that couples components of the computing device 2200 to each other. For example, the communication interface 2210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:

extracting, by at least one computer processor utilizing a data extraction software application integrated with a digital data repository to access the digital data repository, attribute values of a plurality of data objects representing functions or infrastructure associated with handling target data for an entity;

determining, by the at least one computer processor and from the digital data repository, a digital representation of a system requirements framework comprising a plurality of controls associated with handling specific data types;

determining, by the at least one computer processor and by comparing the attribute values of the plurality of data objects to system requirement attribute values indicated by a gap rules set associated with the system requirements framework, a plurality of configuration gaps representing a plurality of control actions for installing controls in connection with one or more data assets or one or more data processing operations to match the attribute values to the system requirement attribute values;

generating, by the at least one computer processor for display via a graphical user interface of a computing device associated with the entity, one or more tasks for applying one or more modifications to the one or more data assets or the one or more data processing operations according to the plurality of configuration gaps; and generating, in response to one or more client device interactions with the one or more tasks via the graphical user interface in connection with applying the one or more modifications to the one or more data assets of the one or more data processing operations, an updated graphical user interface displaying modifications to the one or more tasks.

2. The method of claim 1, wherein extracting the attribute values of the plurality of data objects comprises:

integrating the data extraction software application with the digital data repository and a third-party system via an application programming interface associated with the one or more data assets or the one or more data processing operations; and extracting, utilizing the data extraction software application, the attribute values of the plurality of data objects in response to a selected option to initiate a review of the plurality of controls of the system requirements framework.

3. The method of claim 1, further comprising:

determining that a subset of the attribute values of the plurality of data objects correspond to one or more evidence objects indicating that at least a portion of a control of the plurality of controls is installed in connection with the one or more data assets or the one or more data processing operations; and determining, based on the one or more evidence objects, that the control is installed in connection with the one or more data assets or the one or more data processing operations.

4. The method of claim 3, further comprising:

determining that a particular evidence object of the one or more evidence objects corresponds to an additional control of the plurality of controls; and determining, based on the particular evidence object, that the additional control is installed in connection with the one or more data assets or the one or more data processing operations.

5. The method of claim 1, further comprising generating, in response to a selected option to initiate a review of the plurality of controls of the system requirements framework, an initial compliance score based on a percentage of the plurality of controls installed in connection with the one or more data assets or the one or more data processing operations.

6. The method of claim 1, wherein determining the attribute values of the plurality of data objects comprises:

detecting a missing attribute value for a data object of the plurality of data objects;

generating, in response to detecting the missing attribute value, an assessment comprising a computer-implemented questionnaire including one or more electronic questions associated with the missing attribute value of the data object;

executing the assessment by providing the assessment for display at one or more client devices; and determining the missing attribute value for the data object based on a response to the assessment from the one or more client devices.

7. The method of claim 6, wherein:

executing the assessment comprises:

determining a first response to a first question of the one or more electronic questions provided to the one or more client devices;

skipping, based on the first response, a second question of the one or more electronic questions;

providing, based on the first response, a third question of the one or more electronic questions to the one or more client devices;

determining a second response to the third question; and determining the missing attribute value of the data object comprises determining the missing attribute value based on the first response or the second response.

8. The method of claim 1, wherein determining the plurality of configuration gaps comprises:

determining a gap rule of the gap rules set based on one or more control actions of the plurality of control actions for installing one or more controls in connection with the one or more data assets or the one or more data processing operations; and determining a configuration gap by applying the gap rule to the attribute values of the plurality of data objects to determine whether the attribute values comply with the system requirements framework by comparing the attribute values of the plurality of data objects to the system requirement attribute values.

9. The method of claim 1, further comprising:

detecting a triggering event comprising a change to the digital representation of the system requirements framework or a change to an attribute value of a data object of the plurality of data objects by monitoring data sources corresponding to the plurality of data objects;

determining automatically, in response to the triggering event, whether the change to the digital representation of the system requirements framework or the change to the attribute value of the data object results in one or more additional configuration gaps; and generating, for display on the graphical user interface, one or more additional tasks for applying the one or more modifications to the one or more data assets or the one or more data processing operations according to the one or more additional configuration gaps.

10. The method of claim 1, wherein determining the plurality of configuration gaps comprises performing a plurality of iterations to process the plurality of data objects in connection with the system requirements framework, wherein an iteration of the plurality of iterations comprises:

determining a set of attribute values of a data object of the plurality of data objects; and determining a configuration gap in response to determining that the data object does not comply with the system requirements framework based on the set of attribute values of the data object and the gap rules set.

11. A non-transitory computer readable medium comprising instructions that, when executed by at least one processor, cause the at least one processor to:

extract, by utilizing a data extraction software application integrated with a digital data repository to access the digital data repository, attribute values of a plurality of data objects representing functions or infrastructure associated with handling target data for an entity;

determine, from the digital data repository, a digital representation of a system requirements framework comprising a plurality of controls associated with handling specific data types;

determine, by comparing the attribute values of the plurality of data objects to system requirement attribute values indicated by a gap rules set associated with the system requirements framework, a plurality of configuration gaps representing a plurality of control actions for installing controls in connection with one or more data assets or one or more data processing operations to match the attribute values to the system requirement attribute values;

generate, for display via a graphical user interface of a computing device associated with the entity, one or more tasks for applying one or more modifications to the one or more data assets or the one or more data processing operations according to the plurality of configuration gaps; and track progress of the one or more tasks by monitoring changes to the one or more data assets or the one or more data processing operations in connection with the system requirements framework by generating, in response to one or more client device interactions with the one or more tasks via the graphical user interface in connection with applying the one or more modifications to the one or more data assets of the one or more data processing operations, an updated graphical user interface displaying modifications to the one or more tasks.

12. The non-transitory computer readable medium of claim 11, wherein the instructions that, when executed by the at least one processor, cause the at least one processor to determine the plurality of configuration gaps by:

determining a plurality of attribute values based on the gap rules set; and determining the plurality of configuration gaps by comparing the attribute values of the plurality of data objects to the plurality of attribute values corresponding to the gap rules set.

13. The non-transitory computer readable medium of claim 11, wherein the instructions that, when executed by the at least one processor, cause the at least one processor to:

determine the attribute values of the plurality of data objects by:

integrate the data extraction software application with the digital data repository and a third-party computing system via an application programming interface associated with the one or more data assets or the one or more data processing operations; and extracting, utilizing the data extraction software application, the attribute values of the plurality of data objects in response to a selected option to initiate a review of the plurality of controls of the system requirements framework; and determine that a control of the plurality of controls is installed in connection with the one or more data assets or the one or more data processing operations in response to determining that a subset of the attribute values of the plurality of data objects correspond to one or more evidence objects associated with the control.

14. A system comprising:

one or more non-transitory computer readable media comprising a digital data repository; and at least one processor configured to cause the system to:

perform a plurality of iterations to process a plurality of data objects representing functions or infrastructure associated with handling target data for an entity by:

extracting, by utilizing a data extraction software application integrated with the digital data repository to access the digital data repository, attribute values of the plurality of data objects;

determining, from the digital data repository, a digital representation of a system requirements framework comprising a plurality of controls associated with handling specific data types; and determining, by comparing the attribute values of the plurality of data objects to system requirement attribute values indicated by a gap rules set associated with the system requirements framework, a plurality of configuration gaps representing a plurality of control actions for installing controls in connection with one or more data assets or one or more data processing operations to match the attribute values to the system requirement attribute values;

determine one or more tasks associated with correcting the plurality of configuration gaps by matching the attribute values to the system requirement attribute values;

provide the one or more tasks for display via a graphical user interface of a computing device associated with the entity; and generate, in response to one or more client device interactions with the one or more tasks via the graphical user interface in connection with applying one or more modifications to the one or more data assets of the one or more data processing operations in response to a client device interaction with the one or more tasks for display, an updated graphical user interface displaying modifications to the one or more tasks.

15. The system of claim 14, wherein the at least one processor is further configured to cause the system to extract the attribute values of the plurality of data objects in response to a selected option to initiate a review of the plurality of controls of the system requirements framework.

16. The system of claim 14, wherein the at least one processor is further configured to cause the system to:

detect, based on a subset of the attribute values of the plurality of data objects, a plurality of evidence objects corresponding to a control of the plurality of controls; and determine, based on the plurality of evidence objects, that the control is installed in connection with the one or more data assets or the one or more data processing operations.

17. The system of claim 14, wherein the at least one processor is further configured to cause the system to:

generate, based on the gap rules set associated with the system requirements framework, an initial compliance score based on a percentage of the plurality of controls installed in connection with the one or more data assets or the one or more data processing operations; and provide the initial compliance score with the one or more tasks for display via the graphical user interface of the computing device associated with the entity.

18. The system of claim 14, wherein the at least one processor is further configured to cause the system to determine the attribute values of the plurality of data objects by:

detecting, by the data extraction software application integrated with the digital data repository, a missing attribute value for a data object of the plurality of data objects;

generating, by an assessment software application in response to detecting the missing attribute value, an assessment comprising a computer-implemented questionnaire including one or more electronic questions associated with the missing attribute value of the data object;

executing the assessment by providing the assessment for display at a client device; and determining the missing attribute value for the data object based on a response to the assessment from the client device.

19. The system of claim 14, wherein the at least one processor is further configured to cause the system to determine the plurality of configuration gaps by:

determining a gap rule corresponding to an attribute value for a data object of the plurality of data objects; and determining a configuration gap by comparing one or more attribute values of the plurality of data objects to the gap rule.

20. The system of claim 14, wherein the at least one processor is further configured to cause the system to:

detect a triggering event comprising a change to the digital representation of the system requirements framework or a change to an attribute value of a data object of the plurality of data objects;

determine automatically a configuration gap in response to the triggering event; and generate, for display on the graphical user interface, one or more tasks for applying the one or more modifications to the one or more data assets or the one or more data processing operations according to the configuration gap.

* * * * *